(12) United States Patent
Kunii et al.

(10) Patent No.: US 10,883,007 B2
(45) Date of Patent: Jan. 5, 2021

(54) AQUEOUS PIGMENT DISPERSION

(71) Applicant: KAO CORPORATION, Tokyo (JP)

(72) Inventors: Satoshi Kunii, Wakayama (JP);
Teruyuki Fukuda, Wakayama (JP);
Satoshi Tanaka, Wakayama (JP); Yuki Suzuki, Wakayama (JP)

(73) Assignee: KAO CORPORATION, Tokyo (JP)

(*) Notice: Subject to any disclaimer, the term of this patent is extended or adjusted under 35 U.S.C. 154(b) by 142 days.

(21) Appl. No.: 16/084,122

(22) PCT Filed: Mar. 14, 2017

(86) PCT No.: PCT/JP2017/010223
§ 371 (c)(1),
(2) Date: Sep. 11, 2018

(87) PCT Pub. No.: WO2017/159687
PCT Pub. Date: Sep. 21, 2017

(65) Prior Publication Data
US 2019/0390074 A1    Dec. 26, 2019

(30) Foreign Application Priority Data
Mar. 14, 2016 (JP) ................ 2016-050142

(51) Int. Cl.
| | | |
|---|---|---|
| C09D 11/322 | (2014.01) | |
| C08F 212/08 | (2006.01) | |
| C08F 220/06 | (2006.01) | |
| C08F 220/30 | (2006.01) | |
| C08G 59/22 | (2006.01) | |
| C08J 3/24 | (2006.01) | |
| C08L 63/00 | (2006.01) | |
| C09D 11/102 | (2014.01) | |
| C09D 11/326 | (2014.01) | |

(52) U.S. Cl.
CPC .......... *C09D 11/322* (2013.01); *C08F 212/08* (2013.01); *C08F 220/06* (2013.01); *C08F 220/30* (2013.01); *C08G 59/22* (2013.01); *C08J 3/24* (2013.01); *C08L 63/00* (2013.01); *C09D 11/102* (2013.01); *C08L 2201/54* (2013.01); *C09D 11/326* (2013.01)

(58) Field of Classification Search
CPC ...... C08L 63/00; C08F 220/30; C08F 212/08; C08F 220/06; C09D 17/00; C09D 11/322; C08J 3/24; C08G 59/22
USPC .................................. 523/160, 161
See application file for complete search history.

(56) References Cited

U.S. PATENT DOCUMENTS

| | | | |
|---|---|---|---|
| 2007/0100023 A1* | 5/2007 | Burns | ................ C09B 67/0008 523/160 |
| 2008/0002004 A1 | 1/2008 | O'Donnell et al. | |
| 2010/0112318 A1* | 5/2010 | McIntyre | ................ B01J 13/14 428/206 |
| 2012/0245233 A1 | 9/2012 | Li et al. | |

FOREIGN PATENT DOCUMENTS

| | | |
|---|---|---|
| EP | 3 392 321 A1 | 10/2018 |
| GB | 2528121 A | 1/2016 |
| JP | 9-132743 A | 5/1997 |
| JP | 2007-314784 A | 12/2007 |
| JP | 2008-120948 A | 5/2008 |
| JP | 2008-524369 A | 7/2008 |
| JP | 2009-144007 A | 7/2009 |
| JP | 2010-126602 A | 6/2010 |
| JP | 2010-138297 A | 6/2010 |
| JP | 2013-511605 A | 4/2013 |
| WO | WO 2010/010370 A1 | 1/2010 |

OTHER PUBLICATIONS

Nagase America, Denacol EX-L series, 2010 (Year: 2010).*
Extended European Search Report for European Application No. 17766685.6, dated Sep. 16, 2019.
International Search Report for PCT/JP2017/010223 dated Apr. 11, 2017.

* cited by examiner

Primary Examiner — Doris L Lee
(74) Attorney, Agent, or Firm — Birch, Stewart, Kolasch & Birch, LLP

(57) ABSTRACT

The present invention relates to [1] a pigment water dispersion containing pigment-containing crosslinked polymer particles, in which a crosslinked polymer in the particles is a polymer that is crosslinked with a compound represented by the general formula (1), and the pigment is a carbon black, and [2] a process for producing a pigment water dispersion containing pigment-containing crosslinked polymer particles, including the following steps: Step (1): subjecting a pigment mixture containing a water-dispersible polymer, a pigment and water to dispersion treatment, thereby obtaining an aqueous pigment dispersion solution containing pigment-containing polymer particles; and Step (2): mixing the aqueous pigment dispersion solution obtained in the step (1) and a compound represented by the general formula (1) to react the water-dispersible polymer with the compound to prepare a crosslinked polymer, thereby obtaining the pigment water dispersion containing pigment-containing crosslinked polymer particles.

11 Claims, No Drawings

AQUEOUS PIGMENT DISPERSION

FIELD OF THE INVENTION

The present invention relates to a pigment water dispersion and a process for producing the pigment water dispersion.

BACKGROUND OF THE INVENTION

In ink-jet printing methods, droplets of ink are directly projected onto a printing medium from very fine nozzles by applying heat or mechanical vibration thereto, and allowed to adhere to the printing medium to obtain printed materials on which characters or images are printed. The ink-jet printing methods have become rapidly spread because of various advantages such as easiness of full coloration, low cost, capability of using a plain paper as the printing medium, non-contact with printed characters or images, etc.

In particular, ink-jet printing apparatuses of a thermal type in which an ink is ejected by a foaming pressure of the ink which is generated by heating and boiling water using a heater have widely prevailed because an ink-jet printing head used therein can be manufactured at low cost using MEMS (micro electro mechanical system) technologies, and further the ink-jet printing apparatuses are capable of conducting high-speed printing. In recent years, in order to impart good weathering resistance and water resistance to the printed materials, an ink that contains a pigment as a colorant has been extensively used in the ink-jet printing methods. In consequence, it has been attempted to improve storage stability, etc., of the ink by crosslinking a polymer as a dispersant for the pigment.

For example, JP 2008-524369A (Patent Literature 1) aims at providing a finely dispersed stable encapsulated particulate solid, and discloses a process for preparing an encapsulated particulate solid by crosslinking a dispersant with a crosslinking agent in the presence of a particulate solid and a liquid medium to thereby encapsulate the particulate solid within the crosslinked dispersant, in which the dispersant contains a carboxylic acid group and has an acid value of at least 125 mgKOH/g, and the crosslinking agent contains at least two epoxy groups and one or more oligomeric dispersing groups.

JP 2013-511605A (Patent Literature 2) aims at providing a water-based ink having excellent stability, etc., and discloses an aqueous dispersion system containing solid particles and a vinyl polymeric dispersant, wherein the vinyl polymeric dispersant contains a hydrophilic segment and a hydrophobic segment, the hydrophilic segment contains at least one crosslinkable moiety, and the crosslinkable moiety is crosslinked with a crosslinking agent that is substantially insoluble in an aqueous ink vehicle.

JP 2007-314784A (Patent Literature 3) aims at providing a water-based ink that is excellent in storage stability, etc., and discloses a water dispersion for ink-jet printing which contains colorant-containing water-insoluble crosslinked polymer particles and a water-insoluble organic compound, in which the water-insoluble crosslinked polymer is a polymer obtained by crosslinking a water-insoluble polymer with a crosslinking agent.

In addition, JP 9-132743A (Patent Literature 4) discloses a heating-type ink-jet printing liquid in the form of an aqueous dispersion system using a carbon black having good stability, in which a content of PAH (polyaromatic hydrocarbon) as an impurity in the carbon black is reduced to suppress occurrence of kogation or deposition on a heater which is a problem to be solved peculiar to the thermal-type ink-jet printing.

SUMMARY OF THE INVENTION

The present invention relates to the following aspects [1] and [2].

[1] A pigment water dispersion containing pigment-containing crosslinked polymer particles, in which a crosslinked polymer in the particles is a polymer that is crosslinked with a compound represented by the following general formula (1), and the pigment is a carbon black:

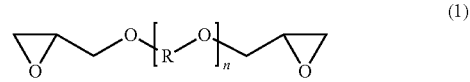

wherein R is an ethylene group or a propylene group, and n is an integer of not less than 1 and not more than 3.

[2] A process for producing a pigment water dispersion containing pigment-containing crosslinked polymer particles, including the following steps:

Step (1): subjecting a pigment mixture containing a water-dispersible polymer, a pigment and water to dispersion treatment, thereby obtaining an aqueous pigment dispersion solution containing pigment-containing polymer particles; and Step (2): mixing the aqueous pigment dispersion solution obtained in the step (1) and a compound represented by the following general formula (1) to react the water-dispersible polymer with the compound to prepare a crosslinked polymer, thereby obtaining the pigment water dispersion containing pigment-containing crosslinked polymer particles:

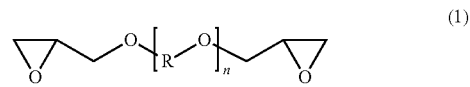

wherein R is an ethylene group or a propylene group, and n is an integer of not less than 1 and not more than 3.

DETAILED DESCRIPTION OF THE INVENTION

In pigment inks for ink-jet printing, the pigment is highly dispersed in the form of particles having a particle size on the order of from several tens to several hundreds of nanometers (hereinafter also referred to merely as "colloids") in a vehicle using a dispersant. However, in recent years, with the remarkable increase in printing speed, the inks tend to be exposed to large thermal or mechanical stress. As a result, at the present time, in order to ensure good ejection stability of the inks for ejecting the inks in a continuous and stable manner (hereinafter also referred to merely as "continuous ejection stability"), there is an increasing demand for a pigment water dispersion having a high colloid stability. In particular, in the ink-jet printing apparatuses of a thermal type, the temperature of a heater in a thermal printing head for ejecting an ink therefrom is momentarily raised to a temperature as high as not lower than 300° C., and there tends to occur such a phenomenon that components of the ink such as a pigment are scorched onto the heater to form deposits thereon, i.e., so-called kogation, so that the ink tends to suffer from reduction of a foaming pressure of the ink as well as poor ejection properties thereof. For this reason, in order to suppress flocculation or deposition of the colloids in the vicinity of a surface of the heater, the colloids are required to have extremely high thermal stability.

On the other hand, in the technologies described in Patent Literatures 1 to 3, the inks used therein are insufficient in thermal stability, and therefore these technologies have failed to fully improve properties of the inks to such an extent as to suppress occurrence of kogation in the heater portion of the thermal printing head. In particular, when using the pigment inks containing the carbon black as an inorganic pigment which tend to suffer from formation of hardly water-soluble deposits, the technologies described in Patent Literatures 1 to 3 are incapable of suppressing occurrence of kogation. In addition, the technology described in Patent Literature 4 has failed to fully cope with high-speed printing.

The present invention relates to a pigment water dispersion that is excellent in thermal stability, in particular, can be prevented from suffering from occurrence of kogation in a heater portion of a thermal printing head, and is also excellent in continuous ejection stability, when compounded in an ink and used for printing, and a process for producing the pigment water dispersion.

The present inventors have found that when a pigment water dispersion that contains pigment-containing crosslinked polymer particles in which a crosslinked polymer contained in the particles is produced by crosslinking a polymer with a specific compound containing an ethyleneoxy group or propyleneoxy group having a specific chain length is compounded in an ink and used for printing, the resulting ink is excellent in thermal stability, in particular, can be prevented from suffering from occurrence of kogation in a heater portion of a thermal printing head, and is also excellent in continuous ejection stability.

That is, the present invention relates to the following aspects [1] and [2].

[1] A pigment water dispersion containing pigment-containing crosslinked polymer particles, in which a crosslinked polymer in the particles is a polymer that is crosslinked with a compound represented by the following general formula (1), and the pigment is a carbon black:

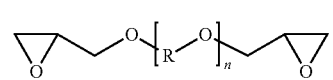

wherein R is an ethylene group or a propylene group, and n is an integer of not less than 1 and not more than 3.

[2] A process for producing a pigment water dispersion containing pigment-containing crosslinked polymer particles, including the following steps:

Step (1): subjecting a pigment mixture containing a water-dispersible polymer, a pigment and water to dispersion treatment, thereby obtaining an aqueous pigment dispersion solution containing pigment-containing polymer particles; and Step (2): mixing the aqueous pigment dispersion solution obtained in the step (1) and a compound represented by the following general formula (1) to react the water-dispersible polymer with the compound to prepare a crosslinked polymer, thereby obtaining the pigment water dispersion containing pigment-containing crosslinked polymer particles:

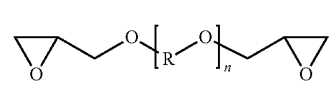

wherein R is an ethylene group or a propylene group, and n is an integer of not less than 1 and not more than 3.

In accordance with the present invention, it is possible to provide a pigment water dispersion that is excellent in thermal stability, in particular, can be prevented from suffering from occurrence of kogation in a heater portion of a thermal printing head, and is also excellent in continuous ejection stability, when compounded in an ink and used for printing, and a process for producing the pigment water dispersion.

[Pigment Water Dispersion]

The pigment water dispersion of the present invention is in the form of a pigment water dispersion that contains crosslinked polymer particles containing a pigment (hereinafter also referred to merely as a "pigment water dispersion") in which a crosslinked polymer contained in the particles is a polymer that is crosslinked with a compound represented by the following general formula (1), and the pigment is a carbon black:

wherein R is an ethylene group or a propylene group, and n is an integer of not less than 1 and not more than 3.

The "crosslinked polymer particles containing a pigment" as used in the present invention (hereinafter also referred to merely as "pigment-containing crosslinked polymer particles") mean particles obtained by adsorbing a water-dispersible polymer onto the surface of the pigment and reacting the water-dispersible polymer with the crosslinking agent as the compound represented by the general formula (1), and the "polymer particles containing a pigment" as used in the present invention (hereinafter also referred to merely as "pigment-containing polymer particles") mean particles before being crosslinked which are obtained by adsorbing the water-dispersible polymer onto the surface of the pigment. In addition, the "unadsorbed polymer" as used in the present invention means the water-dispersible polymer that is not adsorbed onto the pigment in the pigment water dispersion or the water-based ink.

Furthermore, the "polymer that is crosslinked with the compound represented by the general formula (1)" as used in the present invention means a polymer having a crosslinked structure derived from the compound represented by the aforementioned general formula (1) (hereinafter also referred to merely as a "crosslinked polymer").

When the pigment water dispersion of the present invention is compounded in a water-based ink (hereinafter also referred to merely as an "ink") and used for printing, it is possible to produce good printed materials. Therefore, the pigment water dispersion of the present invention can be suitably used as a pigment water dispersion for flexographic printing, gravure printing or ink-jet printing. In addition, when the pigment water dispersion of the present invention is compounded in an ink and used for printing, the resulting ink is excellent in continuous ejection stability when used in ink-jet printing methods, and therefore the pigment water dispersion is preferably used as a pigment water dispersion for ink-jet printing. Furthermore, since the ink using the pigment water dispersion can be prevented from suffering from occurrence of kogation, the pigment water dispersion is more preferably used as a pigment water dispersion for thermal ink-jet printing.

Meanwhile, the "compound represented by the general formula (1)" as used in the present specification is also referred to as a "crosslinking agent".

The reason why the pigment water dispersion of the present invention is excellent in thermal stability, in particular, can be prevented from suffering from occurrence of kogation in a heater portion of a thermal printing head, and is also excellent in continuous ejection stability, when compounded in an ink and used for printing, is considered as follows though it is not clearly determined yet.

That is, it is considered that not only the pigment-containing polymer particles, but also the unadsorbed polymer are present in the pigment water dispersion. The carbon black used as the pigment is generally hydrophobic, but becomes locally slightly hydrophilic because a number of functional groups are present on the surface thereof.

For this reason, when reacting such an unadsorbed polymer with an adequately hydrophilic epoxy-based crosslinking agent containing an ethyleneoxy group or propyleneoxy group having a specific chain length, it is considered that the unadsorbed polymer can be readily adsorbed onto the exposed surface of the carbon black which is locally hydrophilic and uncovered with the polymer, and further when reacting the polymer now adsorbed onto the carbon black with the polymer contained in the polymer particles, the former polymer is firmly fixed onto the surface of the pigment, so that the amount of the unadsorbed polymer dispersed in the pigment water dispersion can be reduced.

In addition, it is considered that the polymer adsorbed onto the pigment is firmly fixed onto the surface of the pigment, and is therefore prevented from desorbing from the pigment even under high temperature conditions, so that it is possible to improve thermal stability of the pigment-containing crosslinked polymer particles and as a result, suppress occurrence of kogation.

Further, it is considered that since the coating ratio of the carbon black with the polymer is enhanced and the carbon black is therefore prevented from directly contacting with a heater portion of a thermal printing head, formation of hardly water-soluble deposits is inhibited, and occurrence of kogation thereon is suppressed. Furthermore, it is considered that these effects of suppressing occurrence of kogation act synergistically, so that the excellent effect of improving continuous ejection stability of the ink can be attained.

At this time, if the crosslinking agent used is excessively hydrophobic, the reactivity of the crosslinking agent with the unadsorbed polymer tends to be lowered, whereas if the crosslinking agent used is excessively hydrophilic, the crosslinking agent tends to remain in the water phase even after being reacted with the unadsorbed polymer. Therefore, it is considered that the use of the epoxy-based crosslinking agent containing an ethyleneoxy group or propyleneoxy group having a specific chain length which is represented by the aforementioned formula (1) highly contributes to the aforementioned advantageous effects of the present invention.

Such a remarkable effect of the present invention that the pigment water dispersion is excellent in thermal stability and continuous ejection stability can be specifically exhibited by the aforementioned combination of the carbon black as the pigment and the specific crosslinking agent. That is, in the case where the carbon black is used in combination with the compound represented by the aforementioned formula (1) in which n is not less than 1 and not more than 3, it is possible to exhibit the remarkable effect of the present invention.

<Pigment>

The pigment-containing crosslinked polymer particles according to the present invention contains the carbon black as the pigment and the crosslinked polymer.

The carbon black may include furnace blacks, thermal lamp blacks, acetylene blacks and channel blacks.

The DBP oil absorption of the carbon black is preferably not less than 50 mL/100 g, more preferably not less than 70 mL/100 g, even more preferably not less than 80 mL/100 g, further even more preferably not less than 90 mL/100 g and still further even more preferably not less than 100 mL/100 g, and is also preferably not more than 200 mL/100 g, more preferably not more than 180 mL/100 g, even more preferably not more than 150 mL/100 g and further even more preferably not more than 130 mL/100 g, from the viewpoint of adequately enhancing hydrophilicity of the carbon black to improve adsorptivity of the polymer onto the surface of the pigment as well as from the viewpoint of improving continuous ejection stability of the resulting ink.

The DBP oil absorption as used herein means an oil absorption as measured by DBP method, more specifically, the value measured according to ASTM D2414-65T.

The volatile content of the carbon black is preferably not more than 6.0% by mass and more preferably not more than 3.0% by mass, and is also preferably not less than 0.5% by mass, more preferably not less than 1.0% by mass and even more preferably not less than 1.5% by mass, from the viewpoint of suppressing occurrence of kogation and improving continuous ejection stability of the resulting ink. The volatile content as used herein means the value calculated from a residual amount of the carbon black when heating the carbon black at 950° C. for 7 minutes (as determined on the basis of ASTM D1620-60).

Specific examples of the commercially available carbon black include "MONARCH 717" (DBP oil absorption: 53; volatile content: 1.0% by mass), "MONARCH 800" (DBP oil absorption: 68; volatile content: 1.5% by mass), "MONARCH 880" (DBP oil absorption: 105; volatile content: 1.5% by mass), "MONARCH 1100" (DBP oil absorption: 50; volatile content: 2.0% by mass), "REGAL 250" (DBP oil absorption: 46; volatile content: 1.0% by mass), "REGAL 330R" (DBP oil absorption: 70; volatile content: 1.0% by mass), "REGAL 415R" (DBP oil absorption: 55; volatile content: 1.0% by mass) and "MOGUL L" (DBP oil absorption: 60; volatile content: 4.5% by mass) all available from Cabot Corporation; and "NIPex 70" (DBP oil absorption: 123; volatile content: 1.2% by mass), "NIPex 60" (DBP oil absorption: 114; volatile content: 1.0% by mass), "NIPex 160IQ" (DBP oil absorption: 128; volatile content: 5.0% by mass), "NIPex 180IQ" (DBP oil absorption: 160; volatile content: 5.0% by mass), "Printex 35" (DBP oil absorption: 42; volatile content: 0.5% by mass), "Printex 55" (DBP oil absorption: 46; volatile content: 1.2% by mass), "Printex 75" (DBP oil absorption: 49; volatile content: 1.2% by mass) and "Printex 85" (DBP oil absorption: 48; volatile content: 1.2% by mass) all available from Orion Engineered Carbons K.K.; and "#900" (DBP oil absorption: 56; volatile content: 1.5% by mass), "#1000" (DBP oil absorption: 56; volatile content: 3.0% by mass), "#2600" (DBP oil absorption: 77; volatile content: 1.8% by mass), "#45L" (DBP oil absorption: 45; volatile content: 1.1% by mass) and "MCF88" (DBP oil absorption: 55; volatile content: 1.5% by mass) all available from Mitsubishi Chemical Corporation. The unit of the aforementioned DBP oil absorption is "mL/100 g".

In the present invention, there may also be used a self-dispersible pigment. The self-dispersible pigment as used herein means a pigment onto a surface of which at least one hydrophilic functional group (including an anionic hydrophilic group such as a carboxy group and a sulfonic group or a cationic hydrophilic group such as a quaternary ammonium group) is bonded either directly or through the other atom group to thereby render the pigment dispersible in an aqueous medium without using a surfactant or a resin. Examples of the other atom group used herein include an alkanediyl group having not less than 1 and not more than 12 carbon atoms, a phenylene group and a naphthylene group.

In order to form a pigment into a self-dispersible pigment, for example, a necessary amount of a hydrophilic functional group may be chemically bonded to the surface of the pigment by an ordinary method. More specifically, there is preferably used a method of subjecting the pigment to liquid phase oxidation with acids such as nitric acid, sulfuric acid, peroxodisulfuric acid, hypochlorous acid and chromic acid or a method of bonding a hydrophilic functional group to the pigment using a coupling agent.

The amount of the hydrophilic functional group to be bonded to the surface of the pigment is not particularly limited, and is preferably not less than 100 µmol and not more than 3,000 µmol per 1 g of the self-dispersible pigment. The amount of a carboxy group as the hydrophilic functional group bonded to the surface of the pigment is preferably not less than 200 µmol and not more than 700 µmol per 1 g of the self-dispersible pigment.

Specific examples of commercially available products of the self-dispersible pigment containing a carboxy group include "CAB-O-JET 200", "CAB-O-JET 300" and "CAB-O-JET 352K" all available from Cabot Corporation, "BONJET BLACK CW-1" and "BONJET BLACK CW-2" both available from Orient Chemical Industries Co., Ltd., "Aqua-Black 162" available from Tokai Carbon Co., Ltd., and "Sensijet Black SDP100", "Sensijet Black SDP1000" and "Sensijet Black SDP2000" all available from Sensient Technologies Corporation.

The aforementioned pigments may be used alone or in the form of a mixture of a any two or more thereof at an optional mixing ratio.

<Crosslinked Polymer>

The crosslinked polymer according to the present invention is a polymer that is crosslinked with the compound represented by the aforementioned formula (1), and has a crosslinked structure derived from the compound. From the viewpoint of improving dispersion stability of the pigment water dispersion and suppressing occurrence of kogation as well as from viewpoint of improving continuous ejection stability of the resulting ink, the crosslinked polymer is preferably in the form of a crosslinked product of the water-dispersible polymer which is obtained by crosslinking the water-dispersible polymer with the compound represented by the aforementioned formula (1).

The water-dispersible polymer as used in the present invention means a polymer before being crosslinked, and also means a polymer having a capability of dispersing the pigment in water or an aqueous medium containing water as a main component at an ordinary temperature.

Examples of the water-dispersible polymer include polyesters, polyurethanes and vinyl-based polymers. Among these polymers, from the viewpoint of improving dispersion stability of the pigment water dispersion and suppressing occurrence of kogation, preferred are vinyl-based polymers obtained by subjecting vinyl monomers to addition polymerization.

The water-dispersible polymer used in the present invention contains a reactive group (crosslinkable functional group) capable of reacting with the compound represented by the aforementioned formula (1) (a dihydric alcohol diglycidyl ether). Examples of the reactive group include hydrophilic functional groups such as a carboxy group, a sulfonic group, a phosphoric group, an amino group and a hydroxy group, etc. Among these reactive groups, from the viewpoint of improving reaction stability of the crosslinking reaction, preferred is a carboxy group. Examples of the carboxy group-containing polymer include (meth)acrylic acid-based polymers.

Meanwhile, the term "(meth)acrylic acid" as used in the present specification means "at least one compound selected from the group consisting of acrylic acid and methacrylic acid", and the "(meth)acrylic acid" as described hereinafter is also defined in the same way.

[Water-Dispersible Polymer]

The water-dispersible polymer is preferably a vinyl-based polymer that contains a constitutional unit derived from (a) a hydrophobic monomer (hereinafter also referred to merely as a "component (a)") and a constitutional unit derived from (b) an ionic monomer (hereinafter also referred to merely as a "component (b)") and more preferably a vinyl-based polymer that further contains a constitutional unit derived from (c) a nonionic monomer (hereinafter also referred to merely as a "component (c)") in addition to the components (a) and (b), from the viewpoint of improving dispersion stability of the pigment water dispersion and suppressing occurrence of kogation as well as from the viewpoint of improving continuous ejection stability of the resulting ink. The vinyl-based polymer is produced by copolymerizing a monomer mixture containing the component (a) and the component (b), and further containing the component (c), if required (such a mixture is hereinafter also referred to merely as a "monomer mixture").

((a) Hydrophobic Monomer)

The water-dispersible polymer preferably contains a constitutional unit derived from the hydrophobic monomer (a) from the viewpoint of improving adsorptivity of the polymer onto the surface of the pigment. The hydrophobic monomer (a) means such a monomer having a solubility in water of less than 10 g as measured by dissolving the monomer in 100 g of ion-exchanged water at 25° C. The solubility in water of the hydrophobic monomer (a) as measured by dissolving the monomer in 100 g of ion-exchanged water at 25° C. is preferably not more than 5 g and more preferably not more than 1 g from the viewpoint of improving adsorptivity of the polymer onto the surface of the pigment. As the hydrophobic monomer (a), there may be mentioned an aromatic group-containing monomer, a (meth)acrylate containing a hydrocarbon group derived from an aliphatic alcohol and the like.

The aromatic group-containing monomer is preferably a vinyl monomer containing an aromatic group having not less than 6 and not more than 22 carbon atoms, and more preferably at least one monomer selected from the group consisting of a styrene-based monomer and an aromatic group-containing (meth)acrylate. The molecular weight of the aromatic group-containing monomer is preferably less than 500.

As the styrene-based monomer, preferred is at least one monomer selected from the group consisting of styrene and 2-methyl styrene, and more preferred is styrene. As the aromatic group-containing (meth)acrylate, preferred is at least one monomer selected from the group consisting of benzyl (meth)acrylate and phenoxyethyl (meth)acrylate, and more preferred is benzyl (meth)acrylate.

Among these monomers, from the viewpoint of improving adsorptivity of the polymer onto the surface of the pigment, the aromatic group-containing (meth)acrylate is preferably used. In addition, the aromatic group-containing (meth)acrylate may also be used in combination with the styrene-based monomer.

Meanwhile, the term "(meth)acrylate" as used in the present specification means "at least one compound selected from the group consisting of an acrylate and a methacrylate", and the "(meth)acrylate" as described hereinafter is also defined in the same way.

As the (meth)acrylate containing a hydrocarbon group derived from an aliphatic alcohol, preferred are those (meth)acrylates containing a hydrocarbon group derived from an aliphatic alcohol having not less than 1 and not more than 22 carbon atoms, more preferred are those (meth)acrylates containing an alkyl group having not less than 1 and not more than 22 carbon atoms, and even more preferred are those (meth)acrylates containing an alkyl group having not less than 6 and not more than 18 carbon atoms.

Examples of the (meth)acrylate containing a hydrocarbon group derived from an aliphatic alcohol include (meth)acrylates containing a linear alkyl group, such as methyl (meth)acrylate, ethyl (meth)acrylate, propyl (meth)acrylate, butyl (meth)acrylate, pentyl (meth)acrylate, octyl (meth)acrylate, decyl (meth)acrylate, dodecyl (meth)acrylate and stearyl (meth)acrylate; (meth)acrylates containing a branched alkyl group, such as isopropyl (meth)acrylate, isobutyl (meth)acrylate, tert-butyl (meth)acrylate, isoamyl (meth)acrylate, isooctyl (meth)acrylate, isodecyl (meth)acrylate, isododecyl (meth)acrylate, isostearyl (meth)acrylate and 2-ethylhexyl (meth)acrylate; and (meth)acrylates containing an alicyclic alkyl group, such as cyclohexyl (meth)acrylate.

As the hydrophobic monomer (a), a macromer is also preferably used. The macromer is in the form of a compound containing a polymerizable functional group at one terminal end thereof and having a number-average molecular weight of not less than 500 and not more than 100,000. From the viewpoint of improving dispersion stability of the pigment water dispersion and suppressing occurrence of kogation, the macromer is preferably in the form of a compound having a number-average molecular weight of not less than 1,000 and not more than 10,000. Meanwhile, the number-average molecular weight of the macromer is the value that is measured by gel permeation chromatography using chloroform containing 1 mmol/L of dodecyl dimethylamine as a solvent and using a polystyrene as a reference standard substance.

As the polymerizable functional group bonded to one terminal end of the macromer, preferred is an acryloyloxy group or a methacryloyloxy group, and more preferred is a methacryloyloxy group.

As the macromer, from the viewpoint of improving adsorptivity of the polymer onto the surface of the pigment, preferred is at least one macromer selected from the group consisting of an aromatic group-containing monomer-based macromer and a silicone-based macromer, and more preferred is an aromatic group-containing monomer-based macromer.

Examples of an aromatic group-containing monomer constituting the aromatic group-containing monomer-based macromer include the same aromatic group-containing monomers as described with respect to the aforementioned hydrophobic monomer (a). Among these aromatic group-containing monomers, preferred are styrene and benzyl (meth)acrylate, and more preferred is styrene.

Specific examples of the styrene-based macromer include "AS-6(S)", "AN-6(S)" and "HS-6(S)" (tradenames) all available from Toagosei Co., Ltd., etc.

Examples of the silicone-based macromer include organopolysiloxanes containing a polymerizable functional group at one terminal end thereof, etc.

From the viewpoint of improving dispersion stability of the pigment water dispersion and suppressing occurrence of kogation as well as from the viewpoint of improving continuous ejection stability of the resulting ink, the hydrophobic monomer (a) is preferably at least one monomer selected from the group consisting of an aromatic group-containing monomer, a (meth)acrylate containing a hydrocarbon group derived from an aliphatic alcohol and an aromatic group-containing monomer-based macromer, more preferably at least one monomer selected from the group consisting of an aromatic group-containing monomer and an aromatic group-containing monomer-based macromer, even more preferably at least one monomer selected from the group consisting of an aromatic group-containing (meth)acrylate and a styrene-based macromer, and further even more preferably a combination of an aromatic group-containing (meth)acrylate and a styrene-based macromer.

((b) Ionic Monomer)

The water-dispersible polymer preferably contains a constitutional unit derived from the ionic monomer (b) from the viewpoint of improving dispersion stability of the pigment water dispersion and suppressing occurrence of kogation as well as from the viewpoint of improving continuous ejection stability of the resulting ink. The ionic monomer (b) is a monomer containing a group that can be converted into an ion under any of acid, neutral and alkaline conditions (hereinafter also referred to merely as an "ionic group"), and preferably such a monomer that a solubility of either the monomer or a salt thereof as measured by dissolving the monomer or salt in 100 g of ion-exchanged water at 25° C. is more than 1 g. The solubility of the ionic monomer (b) as measured by dissolving the monomer or salt in 100 g of ion-exchanged water at 25° C. is preferably more than 5 g and more preferably not less than 10 g from the viewpoint of improving dispersion stability of the pigment water dispersion and suppressing occurrence of kogation as well as from the viewpoint of improving continuous ejection stability of the resulting ink. The ionic monomer (b) preferably contains a reactive group capable of reacting with the aforementioned crosslinking agent from the viewpoint of improving dispersion stability of the pigment water dispersion and suppressing occurrence of kogation as well as from the viewpoint of improving continuous ejection stability of the resulting ink. As the reactive group, there may be used the same reactive groups as described above. Examples of the ionic monomer include an anionic monomer and a cationic monomer which respectively contain the aforementioned reactive group. Among these ionic monomers, from the viewpoint of improving dispersion stability of the pigment water dispersion and suppressing occurrence of kogation as well as from the viewpoint of improving continuous ejection stability of the resulting ink, preferred is the anionic monomer containing the aforementioned reactive group.

Examples of the anionic monomer containing the reactive group include a carboxylic acid monomer, a sulfonic acid monomer and a phosphoric acid monomer.

Specific examples of the carboxylic acid monomer include (meth)acrylic acid, crotonic acid, itaconic acid, maleic acid, fumaric acid, citraconic acid and 2-methacryloyloxymethylsuccinic acid.

Specific examples of the sulfonic acid monomer include styrenesulfonic acid, 2-acrylamido-2-methylpropanesulfonic acid and 3-sulfopropyl (meth)acrylate.

Specific examples of the phosphoric acid monomer include vinylphosphonic acid, vinyl phosphate, bis(methacryloxyethyl)phosphate, diphenyl-2-acryloyloxyethyl phosphate and diphenyl-2-methacryloyloxyethyl phosphate.

Among the aforementioned ionic monomers (b), from the viewpoint of improving dispersion stability of the pigment water dispersion and suppressing occurrence of kogation as well as from the viewpoint of improving continuous ejection stability of the resulting ink, preferred is the anionic monomer, more preferred is the carboxylic acid monomer, even more preferred is (meth)acrylic acid, and further even more preferred is methacrylic acid.

((c) Nonionic Monomer)

The nonionic monomer (c) is a monomer that contains no ionic group described above, and the solubility of the monomer as measured by dissolving the monomer in 100 g of ion-exchanged water at 25° C. is not less than 10 g. As the nonionic monomer (c), there may be mentioned those monomers containing at least one group selected from the group consisting of a hydroxy group and a polyalkyleneoxy group.

Examples of the nonionic monomer (c) include hydroxyalkyl (meth)acrylates such as 2-hydroxyethyl (meth)acrylate and 3-hydroxypropyl (meth)acrylate; polyalkylene glycol (meth)acrylates such as polypropylene glycol (m=2 to 30 wherein m represents an average molar number of addition of an alkyleneoxide: hereinafter defined in the same way) (meth)acrylates; alkoxy polyalkylene glycol (meth)acrylates such as methoxy polyethylene glycol (m=1 to 30) (meth)acrylates and octoxy polyethylene glycol (m=1 to 30) (meth)acrylates; and aralkoxy polyalkylene glycol (meth)acrylates such as phenoxy (ethylene glycollpropylene glycol copolymer) (m=1 to 30 in which m for ethylene glycol: 1 to 29) (meth)acrylates. Among these nonionic monomers, preferred are alkoxy polyalkylene glycol (meth)acrylates, and more preferred are octoxy polyethylene glycol (m=1 to 30) (meth)acrylates.

Specific examples of commercially available products of the component (c) include "NK ESTER M-20G", "NK ESTER M-40G", "NK ESTER M-90G" and "NK ESTER EH-4E" (tradenames) all available from Shin-Nakamura Chemical Co., Ltd.; as well as "BLEMMER PE-90", "BLEMMER PE-200" and "BLEMMER PE-350"; "BLEMMER PME-100", "BLEMMER PME-200" and "BLEMMER PME-400"; "BLEMMER PP-500" and "BLEMMER PP-800"; "BLEMMER AP-150", "BLEMMER AP-400" and "BLEMMER AP-550"; and "BLEMMER 50PEP-300", "BLEMMER 50POEP-800B" and "BLEMMER 43PAPE-600B" (trade names) all available from NOF Corporation. Of these commercially available products of the component (c), from the viewpoint of improving dispersion stability of the pigment water dispersion and suppressing occurrence of kogation, "NK ESTER EH-4E" (octoxy polyethylene glycol methacrylate; average molar number of addition of ethyleneoxide: 4) is preferably used.

From the viewpoint of improving dispersion stability of the pigment water dispersion and suppressing occurrence of kogation as well as from the viewpoint of improving continuous ejection stability of the resulting ink, the nonionic monomer (c) may contain a hydroxy group capable of reacting with the aforementioned crosslinking agent.

The aforementioned components (a) to (c) may be respectively used alone or in combination of any two or more thereof.

Upon production of the water-dispersible polymer, the contents of the aforementioned components (a) to (c) in the monomer mixture (contents of non-neutralized components; hereinafter defined in the same way), i.e., the contents of the constitutional units derived from the components (a) to (c), respectively, in the water-dispersible polymer are as follows.

The content of the component (a) is preferably not less than 40% by mass, more preferably not less than 45% by mass, even more preferably not less than 48% by mass and further even more preferably not less than 50% by mass, and is also preferably not more than 85% by mass, more preferably not more than 80% by mass, even more preferably not more than 75% by mass, further even more preferably not more than 70% by mass, still further even more preferably not more than 65% by mass and still further even more preferably not more than 60% by mass, from the viewpoint of improving adsorptivity of the polymer onto the surface of the pigment.

The content of the component (b) is preferably not less than 10% by mass, more preferably not less than 13% by mass and even more preferably not less than 15% by mass, and is also preferably not more than 25% by mass, more preferably not more than 23% by mass and even more preferably not more than 21% by mass, from the viewpoint of improving dispersion stability of the pigment water dispersion and suppressing occurrence of kogation as well as from the viewpoint of improving continuous ejection stability of the resulting ink.

The content of the component (c) is preferably not less than 0.1% by mass, more preferably not less than 10% by mass, even more preferably not less than 20% by mass and further even more preferably not less than 25% by mass, and is also preferably not more than 40% by mass, more preferably not more than 35% by mass and even more preferably not more than 31% by mass, from the viewpoint of improving dispersion stability of the pigment water dispersion and suppressing occurrence of kogation as well as from the viewpoint of improving continuous ejection stability of the resulting ink.

The mass ratio of the component (a) to the component (b) [component (a)/component (b)] is preferably not less than 0.5, more preferably not less than 1.0, even more preferably not less than 1.5, further even more preferably not less than 2.0 and still further even more preferably not less than 2.5, and is also preferably not more than 5.0, more preferably not more than 4.0 and even more preferably not more than 3.5, from the viewpoint of improving dispersion stability of the pigment water dispersion and suppressing occurrence of kogation as well as from the viewpoint of improving continuous ejection stability of the resulting ink.

(Production of Water-Dispersible Polymer)

The water-dispersible polymer may be produced by copolymerizing a monomer mixture containing the aforementioned hydrophobic monomer (a) and ionic monomer (b), and if required, further containing the aforementioned nonionic monomer (c) and the other monomers, by known polymerization methods. Among the polymerization methods, preferred is a solution polymerization method.

The organic solvent used in the solution polymerization method is not particularly limited, and methyl ethyl ketone, methyl isobutyl ketone, toluene, etc., are preferably used from the viewpoint of attaining good copolymerizability of the monomers.

The polymerization may be carried out in the presence of a polymerization initiator or a chain transfer agent. As the polymerization initiator, preferred are azo compounds, and more preferred is 2,2'-azobis(2,4-dimethylvaleronitrile).

As the chain transfer agent, preferred are mercaptans, and more preferred is 2-mercaptoethanol.

The preferred polymerization conditions are not particularly limited. The polymerization temperature is preferably not lower than 50° C., more preferably not lower than 60° C. and even more preferably not lower than 70° C., and is also preferably not higher than 90° C. and more preferably not higher than 85° C. The polymerization time is preferably not less than 1 hour, more preferably not less than 4 hours and even more preferably not less than 6 hours, and is also preferably not more than 20 hours, more preferably not more than 15 hours and even more preferably not more than 10 hours. In addition, the polymerization is preferably conducted in a nitrogen gas atmosphere or an atmosphere of an inert gas such as argon.

After completion of the polymerization reaction, unreacted monomers, etc., may be removed from the obtained reaction solution by reprecipitation, membrane separation, chromatography, extraction, etc.

From the viewpoint of improving dispersion stability of the pigment water dispersion as well as from the viewpoint of improving continuous ejection stability of the resulting ink, the weight-average molecular weight of the water-dispersible polymer is preferably not less than 3,000, more preferably not less than 5,000, even more preferably not less than 10,000 and further even more preferably not less than 30,000, and is also preferably not more than 200,000, more preferably not more than 100,000, even more preferably not more than 80,000 and further even more preferably not more than 60,000.

Meanwhile, the weight-average molecular weight of the water-dispersible polymer may be measured by the method described in Examples below.

The acid value of the water-dispersible polymer is preferably not less than 100 mgKOH/g and more preferably not less than 120 mgKOH/g, and is also preferably not more than 300 mgKOH/g, more preferably not more than 280 mgKOH/g, even more preferably not more than 250 mgKOH/g and further even more preferably not more than 200 mgKOH/g.

Meanwhile, the acid value of the water-dispersible polymer may be calculated from a ratio between the monomer components used upon production of the polymer. Alternatively, the acid value of the water-dispersible polymer may also be determined by the method of subjecting a solution prepared by dissolving the water-dispersible polymer in a solvent capable of dissolving the polymer therein, such as methyl ethyl ketone, to titration with an alkali agent.

<Crosslinking Agent>

The crosslinking agent used in the present invention is a diglycidyl ether represented by the following general formula (1):

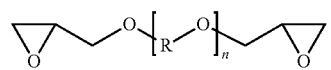
(1)

wherein R is an ethylene group or a propylene group, and n is an integer of not less than 1 and not more than 3.

In the aforementioned formula (1), R is an ethylene group or a propylene group which are respectively derived from a dihydric alcohol. Of these groups as R, preferred is an ethylene group.

In the case where the repeating unit —RO— in the the aforementioned formula (1) is propyleneoxy group, the structure of the propyleneoxy group may be represented by any of —$CH_2CH_2CH_2O$—, —$CH(CH_3)CH_2O$— and —$CH_2CH(CH_3)O$—, and is preferably at least one group selected from the group consisting of —$CH(CH_3)CH_2O$— and —$CH_2CH(CH_3)O$—.

In the aforementioned formula (1), n represents the number of repeating units of the ethyleneoxy group or propyleneoxy group, and is an integer of not less than 1 and preferably not less than 2, and also not more than 3 and preferably not more than 2, and further n is more preferably 2, from the viewpoint of improving adsorptivity of the polymer onto the surface of the pigment.

As the compound (crosslinking agent) represented by the aforementioned formula (1), preferred is at least one compound selected from the group consisting of ethylene glycol diglycidyl ether, propylene glycol diglycidyl ether, diethylene glycol diglycidyl ether, dipropylene glycol diglycidyl ether, triethylene glycol diglycidyl ether and tripropylene glycol diglycidyl ether; more preferred is at least one compound selected from the group consisting of ethylene glycol diglycidyl ether, diethylene glycol diglycidyl ether and dipropylene glycol diglycidyl ether; even more preferred is at least one compound selected from the group consisting of ethylene glycol diglycidyl ether and diethylene glycol diglycidyl ether; and further even more preferred is diethylene glycol diglycidyl ether.

Specific examples of the commercially available crosslinking agents include "DENACOL EX-810" (ethylene glycol diglycidyl ether), "DENACOL EX-811" (ethylene glycol diglycidyl ether), "DENACOL EX-911" (propylene glycol diglycidyl ether), "DENACOL EX-850" (diethylene glycol diglycidyl ether), "DENACOL EX-850L" (diethylene glycol diglycidyl ether), "DENACOL EX-851" (diethylene glycol diglycidyl ether), "DENACOL EX-941" (polypropylene glycol diglycidyl ether; n=2 (catalogue value)) and "DENACOL EX-920" (polypropylene glycol diglycidyl ether; n=3 (catalogue value)) all available from Nagase ChemteX Corporation; "EPOLIGHT 40E" (ethylene glycol diglycidyl ether) and "EPOLIGHT 100E" (diethylene glycol diglycidyl ether) both available from KYOEISHA CHEMICAL Co., Ltd.; and the like.

The crosslinking agent is usually produced from epichlorohydrin, and therefore chlorine (chlorine ion) may be included as an impurity in the crosslinking agent. However, from the viewpoint of suppressing corrosion of a printing apparatus such as an ink-jet printer as well as occurrence of kogation in a heater portion of a thermal printing head used in the case where the ink is ejected by a thermal method in ink-jet printing methods, it is preferred that the content of chlorine in the pigment water dispersion is low. In addition, from the viewpoint of enhancing productivity of the pigment water dispersion, the method of using a crosslinking agent whose chlorine content has been previously reduced, as a raw material thereof is more preferably used rather than the method of reducing the content of chlorine in the resulting pigment water dispersion. From these viewpoints, the content of the chlorine ion as an impurity in the crosslinking agent as the compound represented by the aforementioned formula (1) (chlorine content) is preferably not more than 8.0% by mass, more preferably not more than 5.0% by mass, even more preferably not more than 3.0% by mass, further even more preferably not more than 1.0% by mass, still further even more preferably not more than 0.6% by mass, still further even more preferably not more than 0.5% by mass and still further even more preferably not more than 0.4% by mass. In addition, from the viewpoint of improving productivity of the crosslinking agent, the content of the chlorine ion in the crosslinking agent is preferably not less than 0% by mass and more preferably not less than 0.1% by mass.

It is considered that chlorine contained in the crosslinking agent is present in the form of the chloride ion (CO as an impurity. The content of the chlorine ion in the crosslinking agent may be determined from a chloride ion concentration thereof which may be measured by a titration method or an ion chromatography.

[Process for Producing Pigment Water Dispersion]

The pigment water dispersion of the present invention can be efficiently produced by the process including the following steps:

Step (1): subjecting a pigment mixture containing the water-dispersible polymer, the pigment and water to dispersion treatment, thereby obtaining an aqueous pigment dispersion solution containing pigment-containing polymer particles; and Step (2): mixing the aqueous pigment dispersion solution obtained in the step (1) and the compound represented by the aforementioned formula (1) to react the water-dispersible polymer with the compound to prepare a crosslinked polymer, thereby obtaining the pigment water dispersion containing pigment-containing crosslinked polymer particles.

<Step (1)>

The step (1) is the step of subjecting a pigment mixture containing the water-dispersible polymer, the pigment and water to dispersion treatment, thereby obtaining an aqueous pigment dispersion solution containing pigment-containing polymer particles.

The step (1) is preferably the step of mixing the water-dispersible polymer, the pigment and water, if required, further adding a neutralizing agent, a surfactant, etc., thereto to obtain the pigment mixture, and then subjecting the thus obtained pigment mixture to dispersion treatment, thereby obtaining the aqueous pigment dispersion solution. The order of addition of the respective components is not particularly limited, and it is preferred that the neutralizing agent, water and the pigment are successively added in this order.

(Neutralizing Agent)

In the step (1), from the viewpoint of improving dispersion stability of the aqueous pigment dispersion solution as well as from the viewpoint of improving continuous ejection stability of the resulting ink, a neutralizing agent is preferably used. When using the neutralizing agent, the neutralization is preferably conducted such that the pH value of the resulting aqueous pigment dispersion solution lies within the range of not less than 7 and not more than 11.

Examples of the neutralizing agent used in the step (1) include hydroxides of alkali metals, ammonia and organic amines. Of these neutralizing agents, from the viewpoint of improving dispersion stability of the aqueous pigment dispersion solution as well as from the viewpoint of improving continuous ejection stability of the resulting ink, preferred is at least one compound selected from the group consisting of hydroxides of alkali metals and ammonia, and more preferred are hydroxides of alkali metals.

Specific examples of the hydroxides of alkali metals include lithium hydroxide, sodium hydroxide, potassium hydroxide and cesium hydroxide. Of these hydroxides of alkali metals, preferred is sodium hydroxide.

The neutralizing agent is preferably used in the form of an aqueous neutralizing agent solution from the viewpoint of sufficiently promoting neutralization of the polymer. From the viewpoint of sufficiently promoting neutralization of the polymer, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The neutralizing agent and the aqueous neutralizing agent solution are respectively used alone or in the form of a mixture of any two or more kinds thereof.

The degree of neutralization of the water-dispersible polymer is preferably not less than 60 mol %, more preferably not less than 80 mol % and even more preferably not less than 100 mol %, and is also preferably not more than 400 mol %, more preferably not more than 200 mol % and even more preferably not more than 150 mol %, from the viewpoint of improving dispersion stability of the aqueous pigment dispersion solution as well as from the viewpoint of improving continuous ejection stability of the resulting ink.

The degree of neutralization as used herein means the value obtained by dividing a mole equivalent value of the neutralizing agent by a molar amount of the anionic group in the water-dispersible polymer. The aforementioned anionic group may include a carboxy group of the ionic monomer, etc.

Inherently, the degree of neutralization of the polymer does not exceed 100 mol %. However, in the present invention, since the degree of neutralization of the polymer is calculated from an amount of the neutralizing agent used, if the neutralizing agent is used in an excessive amount relative to the polymer, the degree of neutralization of the polymer will exceed 100 mol %.

In addition, in the case where the volatile base is used as the neutralizing agent, it is possible to suitably control not only the degree of neutralization of the pigment mixture in the course of the step (1), but also the degree of neutralization of each of the aqueous pigment dispersion solution produced in a final stage of the step (1) and the pigment water dispersion obtained in the step (2). More specifically, the volatile base such as ammonia, etc., used as the neutralizing agent is charged in an excessive amount relative to a molar amount of the anionic group of the water-dispersible polymer in the course of the step (1), and then removed in the final stage of the step (1), whereby it is possible to obtain the aqueous pigment dispersion solution having a desired neutralization degree. In such a case, the amount of the volatile base used as the neutralizing agent is not less than 0 mol %, and is also preferably not more than 300 mol %, more preferably not more than 100 mol % and even more preferably not more than 50 mol %.

The content of the pigment in the pigment mixture is preferably not less than 5.0% by mass, more preferably not less than 8.0% by mass and even more preferably not less than 10% by mass, and is also preferably not more than 30% by mass, more preferably not more than 25% by mass and even more preferably not more than 20% by mass, from the viewpoint of improving dispersion stability of the aqueous pigment dispersion solution and enhancing productivity of the aqueous pigment dispersion solution as well as from the viewpoint of improving continuous ejection stability of the resulting ink.

The mass ratio of the pigment to the water-dispersible polymer [pigment/water-dispersible polymer] in the pigment mixture is preferably from 80/20 to 50/50, more preferably from 75/25 to 60/40 and even more preferably from 70/30 to 65/35, from the viewpoint of improving dispersion stability of the aqueous pigment dispersion solution as well as from the viewpoint of improving continuous ejection stability of the resulting ink.

In the step (1), the resulting pigment mixture is subjected to dispersion treatment to obtain the aqueous pigment dispersion solution. The dispersing method for obtaining the aqueous pigment dispersion solution is not particularly limited. The pigment particles may be atomized into fine particles having a desired average particle size by subjecting the pigment mixture to a substantial dispersion treatment only. However, it is preferred that the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in the step (1) is preferably not lower than 0° C., and is also preferably not higher than 40° C., more preferably not higher than 30° C. and even more preferably not higher than 20° C. The dispersing time of the aforementioned dispersion treatment is preferably not less than 1 hour and more preferably not less than 2 hours, and is also preferably not more than 30 hours, more preferably not more than 10 hours and even more preferably not more than 5 hours.

When subjecting the aforementioned pigment mixture to the preliminary dispersion treatment, there may be used ordinary mixing and stirring devices such as an anchor blade and a disper blade. Of these mixing and stirring devices, preferred are high-speed stirring mixers.

As a means for applying a shear stress to the pigment mixture in the substantial dispersion treatment, there may be used, for example, kneading machines such as roll mills, kneaders and the like, high-pressure homogenizers such as "Microfluidizer" (tradename) available from Microfluidics Corporation, and media-type dispersers such as paint shakers and beads mills. Examples of the commercially available media-type dispersers include "Ultra Apex Mill" (tradename) available from Kotobuki Industries Co., Ltd., and "Pico Mill" (tradename) available from Asada Iron Works Co., Ltd. These devices may be used in combination of any two or more thereof. Among these devices, the high-pressure homogenizers are preferably used from the viewpoint of reducing the particle size of the pigment.

In the case where the substantial dispersion treatment is conducted using the high-pressure homogenizer, the particle size of the pigment can be adjusted to a desired value by controlling the treating pressure and the frequency of passing the pigment mixture through the homogenizer used in the substantial dispersion treatment. The treating pressure used in the substantial dispersion treatment is preferably not less than 60 MPa, more preferably not less than 100 MPa and even more preferably not less than 150 MPa, and is also preferably not more than 250 MPa, more preferably not more than 200 MPa and even more preferably not more than 180 MPa. Also, the frequency of passing the pigment mixture through the homogenizer used in the substantial dispersion treatment is preferably not less than 3 times, more preferably not less than 10 times and even more preferably not less than 15 times, and is also preferably not more than 30 times, more preferably not more than 25 times and even more preferably not more than 20 times.

The step (1) preferably includes the following steps (1-1) and (1-2) as the method in which before subjecting the pigment mixture to the dispersion treatment, the water-dispersible polymer is dissolved in an organic solvent, and then the dispersion treatment is conducted to obtain a dispersion treatment product, followed by removing the organic solvent therefrom.

Step (1-1); dissolving the water-dispersible polymer in an organic solvent and then adding the pigment and water to the resulting solution to prepare the pigment mixture, and thereafter subjecting the resulting pigment mixture to dispersion treatment, thereby obtaining the dispersion treatment product containing pigment-containing polymer particles; and Step (1-2): removing the organic solvent from the dispersion treatment product obtained in the step (1-1), thereby obtaining the aqueous pigment dispersion solution containing pigment-containing polymer particles.

[Step (1-1)]

In the step (1-1), it is preferred that the water-dispersible polymer is first dissolved in an organic solvent, and then the pigment and water are added and mixed, if required, together with the neutralizing agent, the surfactant, etc., into the resulting solution to prepare a pigment mixture, and thereafter the resulting pigment mixture is subjected to dispersion treatment to obtain the dispersion treatment product in the form of an oil-in-water dispersion. The order of addition of the respective components in the step (1-1) is not particularly limited, and it is preferred that the neutralizing agent, water and the pigment are successively added in this order. In addition, the dispersing method used in the step (1-1) is the same as the dispersing method described previously, and the content of the pigment in the pigment mixture as well as the mass ratio of the pigment to the water-dispersible polymer are also the same as those described previously.

(Organic Solvent)

It is preferred that the organic solvent used in the step (1-1) has a high affinity to the water-dispersible polymer, and on the other hand, has a low solubility in water used as a main solvent in the step (1-1). More specifically, it is preferred that the solubility of the organic solvent in water as measured at 20° C. is less than 40% by mass.

Examples of the preferred organic solvent include at least one solvent selected from the group consisting of aliphatic alcohols, ketones, ethers and esters. Among these organic solvents, from the viewpoint of improving wettability to the pigment and adsorptivity of the water-dispersible polymer to the pigment, more preferred are ketones, and even more preferred is methyl ethyl ketone.

The mass ratio of the water-dispersible polymer to the organic solvent [water-dispersible polymer/organic solvent] in step (1-1) is preferably not less than 0.10, more preferably not less than 0.20 and even more preferably not less than 0.25, and is also preferably not more than 0.60, more preferably not more than 0.50 and even more preferably not more than 0.45, from the viewpoint of improving wettability to the pigment and adsorptivity of the water-dispersible polymer to the pigment.

The mass ratio of the neutralizing agent to the organic solvent [neutralizing agent/organic solvent] in step (1-1) is preferably not less than 0.010, more preferably not less than 0.020 and even more preferably not less than 0.025, and is also preferably not more than 0.10, more preferably not more than 0.060 and even more preferably not more than 0.050, from the viewpoint of improving adsorptivity of the water-dispersible polymer to the pigment and promoting neutralization of the water-dispersible polymer to enhance dispersibility of the pigment-containing polymer particles, and as a result, from the viewpoint of preventing formation of coarse particles to improve continuous ejection stability of the resulting ink.

[Step (1-2)]

The step (1-2) is the step of removing the aforementioned organic solvent from the dispersion treatment product obtained in the step (1-1) by conventionally known methods to thereby obtain the aqueous pigment dispersion solution containing the pigment-containing polymer particles.

From the viewpoint of suppressing formation of aggregates in the course of removing the organic solvent, from the viewpoint of improving dispersion stability of the aqueous pigment dispersion solution as well as from the viewpoint of improving continuous ejection stability of the resulting ink, it is preferred that water is added to the dispersion treatment product prior to removal of the organic solvent therefrom to suitably control a mass ratio of the organic solvent to water in the dispersion treatment product. The mass ratio of the organic solvent to water [organic solvent/water] in the dispersion treatment product after being controlled is preferably not less than 0.15 and more preferably not less than 0.20, and is also preferably not more than 0.40 and more preferably not more than 0.30.

In addition, the concentration of non-volatile components (solid content) in the dispersion treatment product obtained after controlling the mass ratio of the organic solvent to water therein is preferably not less than 5.0% by mass, more preferably not less than 10% by mass and even more preferably not less than 15% by mass, and is also preferably not more than 30% by mass, more preferably not more than 20% by mass and even more preferably not more than 18% by mass, from the viewpoint of suppressing formation of aggregates in the course of removing the organic solvent as well as from the viewpoint of enhancing productivity of the aqueous pigment dispersion solution. Meanwhile, in the step (1-2), a part of water contained in the aforementioned dispersion may be removed simultaneously with removal of the organic solvent.

Examples of the apparatus for removing the organic solvent used in the present step (1-2) include a thin film distillation apparatus such as a batch simple distillation device, a reduced pressure distillation device and a flush evaporator, a rotary distillation device and a stirring evaporator. Among these apparatuses, from the viewpoint of efficiently removing the organic solvent, preferred are a rotary distillation device and a stirring evaporator, more preferred is a rotary distillation device, and even more preferred is a rotary evaporator.

The temperature of the dispersion treatment product upon removing the organic solvent therefrom may be appropriately selected depending upon the kind of organic solvent to be removed. The temperature of the dispersion treatment product upon removing the organic solvent therefrom under reduced pressure is preferably not lower than 40° C., and is also preferably not higher than 80° C., more preferably not higher than 70° C. and even more preferably not higher than 65° C. The pressure of the reaction system upon removal of the organic solvent is preferably not less than 0.005 MPa and more preferably not less than 0.01 MPa, and is also preferably not more than 0.5 MPa, more preferably not more than 0.2 MPa and even more preferably not more than 0.1 MPa. The time required upon removal of the organic solvent is preferably not less than 1 hour, more preferably not less than 2 hours and even more preferably not less than 5 hours, and is also preferably not more than 24 hours, more preferably not more than 12 hours and even more preferably not more than 10 hours.

The organic solvent is preferably substantially completely removed from the thus obtained aqueous pigment dispersion solution. However, the residual organic solvent may be present in the aqueous pigment dispersion solution unless the objects and advantageous effects of the present invention are adversely affected by the residual organic solvent. The content of the residual organic solvent in the resulting aqueous pigment dispersion solution is preferably not more than 0.9% by mass, more preferably not more than 0.1% by mass and even more preferably not more than 0.01% by mass.

The concentration of the non-volatile components (solid content) in the aqueous pigment dispersion solution obtained in the step (1) is preferably not less than 10% by mass, more preferably not less than 15% by mass and even more preferably not less than 18% by mass, and is also preferably not more than 30% by mass, more preferably not more than 25% by mass and even more preferably not more than 22% by mass, from the viewpoint of improving dispersion stability of the aqueous pigment dispersion solution as well as from the viewpoint of facilitating production of the pigment water dispersion.

The average particle size of the pigment-containing polymer particles that are contained in the aqueous pigment dispersion solution obtained in the step (1) is preferably not less than 40 nm, more preferably not less than 50 nm and even more preferably not less than 60 nm, and is also preferably not more than 200 nm, more preferably not more than 150 nm and even more preferably not more than 130 nm, from the viewpoint of improving dispersion stability of the aqueous pigment dispersion solution as well as from the viewpoint of improving continuous ejection stability of the resulting ink. The average particle size of the pigment-containing polymer particles may be measured by the method described in Examples below.

<Step (2)>

The step (2) is the step of mixing the aqueous pigment dispersion solution obtained in the step (1) and the compound (crosslinking agent) represented by the aforementioned formula (1) to react the water-dispersible polymer contained in the aqueous pigment dispersion solution with the compound to prepare a crosslinked polymer, thereby obtaining the pigment water dispersion containing the pigment-containing crosslinked polymer particles according to the present invention.

The catalyst, solvent, reaction temperature and reaction time used in the crosslinking reaction, etc., may be appropriately determined according to the crosslinking agent used therein. The temperature used in the crosslinking reaction is preferably not lower than 40° C. and more preferably not lower than 60° C., and is also preferably not higher than 95° C. and more preferably not higher than 80° C. The time of the crosslinking reaction is preferably not less than 0.5 hour and more preferably not less than 1 hour, and is also preferably not more than 10 hours and more preferably not more than 5 hours.

The amount of the compound represented by the aforementioned formula (1) which is used in the crosslinking reaction is preferably not less than 0.50 part by mass, more preferably not less than 1.0 part by mass, even more preferably not less than 2.0 parts by mass and further even more preferably not less than 3.0 parts by mass on the basis of 100 parts by mass of the water-dispersible polymer from the viewpoint of improving continuous ejection stability of the resulting ink, and is also preferably not more than 15 parts by mass, more preferably not more than 13 parts by mass, even more preferably not more than 10 parts by mass and further even more preferably not more than 8.0 parts by mass on the basis of 100 parts by mass of the water-dispersible polymer from the viewpoint of improving continuous ejection stability of the resulting ink.

The crosslinking rate of the crosslinked polymer is preferably not less than 10 equivalent % and more preferably not less than 15 equivalent %, and is also preferably not more than 90 equivalent %, more preferably not more than 70 equivalent %, even more preferably not more than 50 equivalent % and further even more preferably not more than 30 equivalent %.

Meanwhile, the crosslinking rate is the value obtained by dividing the number of equivalents of epoxy groups in the crosslinking agent by the number of equivalents of reactive groups (e.g., ionic groups) in the water-dispersible polymer which are capable of reacting with the crosslinking agent.

The pigment water dispersion of the present invention is in the form of a dispersion in which the pigment and the crosslinked polymer as solid components are dispersed in an aqueous medium containing water as a main medium.

In this case, the configuration of the pigment water dispersion is not particularly limited. Examples of the configuration of the pigment water dispersion include (1) the configuration in which the crosslinked polymer is adsorbed onto the surface of respective particles of the pigment to form dispersed particles containing a plurality of the pigment particles, (2) the configuration in which the pigment is enclosed or encapsulated in the crosslinked polymer and dispersed in the pigment water dispersion, (3) the configuration in which the pigment is exposed onto the surface of the respective crosslinked polymer particles and dispersed in the pigment water dispersion, and (4) a combination of these configurations such as the configuration in which the crosslinked polymer is partially adsorbed onto the surface of the respective particles of the pigment and dispersed in the pigment water dispersion, and the like.

(Composition and Properties of Pigment Water Dispersion)

The content of the pigment in the pigment water dispersion is preferably not less than 3.0% by mass, more preferably not less than 5.0% by mass, even more preferably not less than 7.0% by mass and further even more preferably not less than 9.0% by mass, and is also preferably not more than 20% by mass, more preferably not more than 17% by mass, even more preferably not more than 15% by mass and further even more preferably not more than 13% by mass, from the viewpoint of improving dispersion stability of the pigment water dispersion and suppressing occurrence of kogation as well as from the viewpoint of improving continuous ejection stability of the resulting ink.

The content of the crosslinked polymer in the pigment water dispersion is preferably not less than 0.5% by mass, more preferably not less than 1.0% by mass, even more preferably not less than 3.0% by mass and further even more preferably not less than 5.0% by mass, and is also preferably not more than 15% by mass, more preferably not more than 10% by mass and even more preferably not more than 7.0% by mass, from the viewpoint of improving dispersion stability of the pigment water dispersion and suppressing occurrence of kogation as well as from the viewpoint of improving continuous ejection stability of the resulting ink.

The content of water in the pigment water dispersion is preferably not less than 50% by mass, more preferably not less than 60% by mass and even more preferably not less than 75% by mass, and is also preferably not more than 95% by mass, more preferably not more than 90% by mass and even more preferably not more than 85% by mass, from the viewpoint of improving continuous ejection stability of the resulting ink.

The mass ratio of the pigment to the crosslinked polymer [pigment/crosslinked polymer] in the pigment water dispersion is preferably from 85/15 to 50/50, more preferably from 80/20 to 55/45, even more preferably from 80/20 to 60/40, further even more preferably from 75/25 to 65/35 and still further even more preferably from 70/30 to 65/35 from the viewpoint of improving continuous ejection stability of the resulting ink as well as from the viewpoint of enhancing optical density of the ink.

The average particle size of the pigment-containing crosslinked polymer particles that are contained in the pigment water dispersion of the present invention is preferably not less than 40 nm, more preferably not less than 50 nm and even more preferably not less than 60 nm, and is also preferably not more than 200 nm, more preferably not more than 150 nm and even more preferably not more than 130 nm, from the viewpoint of improving dispersion stability of the pigment water dispersion and suppressing occurrence of kogation as well as from the viewpoint of improving continuous ejection stability of the resulting ink.

Meanwhile, the average particle size of the pigment-containing crosslinked polymer particles in the pigment water dispersion may be measured by the method described in Examples below.

The static surface tension of the pigment water dispersion as measured at 20° C. is preferably not less than 23 mN/m and more preferably not less than 25 mN/m, and is also preferably not more than 50 mN/m and more preferably not more than 48 mN/m, from the viewpoint of improving continuous ejection stability of the resulting ink.

Meanwhile, the static surface tension of the pigment water dispersion as measured at 20° C. may be measured by the method described in Examples below.

The viscosity of the pigment water dispersion as measured at 35° C. is preferably not less than 1.0 mPa·s, more preferably not less than 1.5 mPa·s and even more preferably not less than 2.0 mPa·s, and is also preferably not more than 10 mPa·s, more preferably not more than 7.0 mPa·s and even more preferably not more than 4.0 mPa·s, from the viewpoint of improving continuous ejection stability of the resulting ink.

Meanwhile, the viscosity of the pigment water dispersion as measured at 35° C. may be measured by the method described in Examples below.

The pigment water dispersion of the present invention may be include various additives usually used in a water-based ink, e.g., such as a solvent, a penetrant, a dispersant, a surfactant, a viscosity controller, a defoaming agent, a rust preventive, an antiseptic agent, a mildew-proof agent and the like, and may be directly used as a water-based ink for flexographic printing, gravure printing or ink-jet printing, preferably as a water-based ink for ink-jet printing.

[Water-Based Ink for Ink-Jet Printing]

The water-based ink for ink-jet printing according to the present invention contains the aforementioned pigment water dispersion, a solvent and water. The water-based ink may further contain, in addition to the solvent, various other additives such as a penetrant, a dispersant, a surfactant, a viscosity controller, a defoaming agent, a rust preventive, an antiseptic agent, a mildew-proof agent and the like.

The water-based ink for ink-jet printing according to the present invention is produced by compounding the aforementioned pigment water dispersion, the solvent and water with each other. The amount of the pigment water dispersion compounded in the water-based ink is as described below, and it is preferred that the solvent and water are compounded in the pigment water dispersion such that the contents of the solvent and water in the resulting water-based ink respectively fall within the following predetermined ranges.

<Pigment Water Dispersion>

The amount of the pigment water dispersion of the present invention compounded in the water-based ink is preferably not less than 15% by mass, more preferably not less than 20% by mass and even more preferably not less than 25% by mass, and is also preferably not more than 60% by mass, more preferably not more than 55% by mass and even more preferably not more than 50% by mass, from the viewpoint of suppressing occurrence of kogation as well as from the viewpoint of improving continuous ejection stability of the resulting ink.

The content of the pigment in the water-based ink is preferably not less than 1.0% by mass, more preferably not less than 2.0% by mass and even more preferably not less than 3.0% by mass, and is also preferably not more than 20% by mass, more preferably not more than 15% by mass, even more preferably not more than 10% by mass and further even more preferably not more than 8.0% by mass, from the viewpoint of enhancing optical density of the resulting ink, from the viewpoint of suppressing occurrence of kogation as well as from the viewpoint of improving continuous ejection stability of the ink.

The content of the crosslinked polymer in the water-based ink is preferably not less than 0.10% by mass, more preferably not less than 0.15% by mass and even more preferably not less than 0.20% by mass, and is also preferably not more than 5.0% by mass, more preferably not more than 3.5% by mass and even more preferably not more than 2.5% by mass, from the viewpoint of suppressing occurrence of kogation as well as from the viewpoint of improving continuous ejection stability of the resulting ink.

<Solvent>

The term "solvent" as used in the present invention means those solvents other than water.

From the viewpoint of suppressing excessive increase in viscosity of the resulting ink owing to the crosslinked polymer, from the viewpoint of preventing the ink from being dried and improving continuous ejection stability of the ink, the water-based ink preferably contains an organic solvent as the solvent.

Examples of the organic solvent include glycol ethers, polyhydric alcohols, monohydric alcohols, alkyl ethers of these alcohols, nitrogen-containing heterocyclic compounds, amides, amines and sulfur-containing compounds. Among these organic solvents, from the viewpoint of improving continuous ejection stability of the resulting ink, preferred is at least one organic solvent selected from the group consisting of glycol ethers, polyhydric alcohols and nitrogen-containing heterocyclic compounds.

Specific examples of the glycol ethers include alkylene glycol monoalkyl ethers, alkylene glycol dialkyl ethers and the like. Among these glycol ethers, from the viewpoint of improving continuous ejection stability of the resulting ink, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include ethylene glycol ethyl ether, ethylene glycol isopropyl ether, ethylene glycol propyl ether, ethylene glycol butyl ether, diethylene glycol methyl ether, diethylene glycol ethyl ether, diethylene glycol isopropyl ether, diethylene glycol isobutyl ether, diethylene glycol butyl ether, triethylene glycol methyl ether, dipropylene glycol methyl ether, dipropylene glycol ethyl ether, dipropylene glycol butyl ether and tripropylene glycol methyl ether, etc.

Of these alkylene glycol monoalkyl ethers, from the viewpoint of improving quality of printed characters or images, preferred is at least one compound selected from the group consisting of ethylene glycol isopropyl ether, ethylene glycol propyl ether, diethylene glycol methyl ether, diethylene glycol isopropyl ether, diethylene glycol isobutyl ether and diethylene glycol butyl ether, and more preferred is at least one compound selected from the group consisting of ethylene glycol isopropyl ether, diethylene glycol isopropyl ether and diethylene glycol isobutyl ether.

Examples of the polyhydric alcohols include 1,2-alkanediols such as ethylene glycol, propylene glycol, 1,2-butanediol, 1,2-pentanediol and 1,2-hexanediol; polyethylene glycols such as diethylene glycol, triethylene glycol and tetraethylene glycol; dipropylene glycol, polypropylene glycols, 1,3-propanediol, 1,3-butanediol, 1,4-butanediol, 3-methyl-1,3-butanediol, 1,5-pentanediol, 2-methyl-2,4-pentanediol, 1,2,6-hexanetriol, 1,2,4-butanetriol, 1,2,3-butanetriol and petriol, etc.

Examples of the nitrogen-containing heterocyclic compounds include 2-pyrrolidone, N-methyl-2-pyrrolidone, 1,3-dimethyl imidazolidinone, ε-caprolactam, etc.

Of these nitrogen-containing heterocyclic compounds, from the viewpoint of improving continuous ejection stability of the resulting ink, preferred is 2-pyrrolidone.

Among the aforementioned solvents, from the viewpoint of improving continuous ejection stability of the resulting ink, preferred is at least one compound selected from the group consisting of diethylene glycol butyl ether, dipropylene glycol methyl ether, dipropylene glycol ethyl ether, dipropylene glycol butyl ether, and alkanediols having not less than 2 and not more than 6 carbon atoms, such as propylene glycol, diethylene glycol, polyethylene glycols, polypropylene glycols and 1,2-hexanediol, and more preferred is at least one compound selected from the group consisting of propylene glycol and polyethylene glycols.

Meanwhile, the average molecular weight of the polyethylene glycols is preferably not less than 150, more preferably not less than 200 and even more preferably not less than 400, and is also preferably not more than 2,000 and more preferably not more than 1,000. The average molecular weight of the polypropylene glycols is preferably not less than 300 and more preferably not less than 400, and is also preferably not more than 1,000 and more preferably not more than 800.

The content of the solvent in the water-based ink is preferably not less than 5.0% by mass and more preferably not less than 8.0% by mass, and is also preferably not more than 60% by mass, more preferably not more than 50% by mass, even more preferably not more than 40% by mass, further even more preferably not more than 30% by mass, still further even more preferably not more than 20% by mass and still further even more preferably not more than 15% by mass, from the viewpoint of improving continuous ejection stability of the resulting ink.

The content of the organic solvent in the water-based ink is preferably not less than 4.0% by mass, more preferably not less than 5.0% by mass and even more preferably not less than 8.0% by mass, and is also preferably not more than 55% by mass, more preferably not more than 50% by mass, even more preferably not more than 40% by mass, further even more preferably not more than 30% by mass, still further even more preferably not more than 20% by mass, still further even more preferably not more than 15% by mass and still further even more preferably not more than 12% by mass, from the viewpoint of improving continuous ejection stability of the resulting ink.

<Surfactant>

The water-based ink of the present invention may further contain a surfactant from the viewpoint of improving continuous ejection stability of the resulting ink. As the surfactant, there may be used at least one surfactant selected from the group consisting of a polyether-modified silicone-based surfactant and a nonionic surfactant.

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group and a propyleneoxy group (a trimethyleneoxy group or a propane-1,2-diyloxy group) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, etc.

Examples of the nonionic surfactant include (1) alkyl ethers, alkenyl ethers, alkynyl ethers or aryl ethers of polyoxyalkylenes which are produced by adding ethyleneoxide, propyleneoxide or butyleneoxide (hereinafter collectively referred to as an "alkyleneoxide") to a saturated or unsaturated, linear or branched higher alcohol having not less than 8 and not more than 22 carbon atoms, a polyhydric alcohol or an aromatic alcohol, (2) esters of a higher alcohol containing a saturated or unsaturated, linear or branched hydrocarbon group having not less than 8 and not more than 22 carbon atoms, and a polyvalent fatty acid, (3) polyoxyalkylene aliphatic amines containing a linear or branched alkyl group or alkenyl group having not less than 8 and not more than 20 carbon atoms, and (4) ester compounds of a higher fatty acid having not less than 8 and not more than 22 carbon atoms and a polyhydric alcohol, or compounds produced by adding an alkyleneoxide to the ester compounds.

Examples of commercially available products of the nonionic surfactant include "SURFYNOL"-series products available from Air Products & Chemicals, Inc., "ACETYLENOL"-series products available from Kawaken Fine Chemicals Co., Ltd., and "EMULGEN 120" (an ethyleneoxide adduct of lauryl alcohol) available from Kao Corporation, etc.

The content of the surfactant in the water-based ink is preferably not less than 0.10% by mass, more preferably not less than 0.20% by mass and even more preferably not less than 0.30% by mass, and is also preferably not more than 5.0% by mass, more preferably not more than 3.0% by mass and even more preferably not more than 2.5% by mass, from the viewpoint of suppressing increase in viscosity of the resulting ink and improving continuous ejection stability of the ink as well as from the viewpoint of obtaining good printed materials that are free of roller transfer contamination and intercolor bleeding.

<Water>

The content of water in the water-based ink is preferably not less than 50% by mass, more preferably not less than 60% by mass and even more preferably not less than 75% by mass, and is also preferably not more than 95% by mass and more preferably not more than 90% by mass, from the viewpoint of improving continuous ejection stability of the resulting ink.

It is preferred that the pigment-containing crosslinked polymer particles in the water-based ink are free of swelling or contraction of the particles and flocculation between the particles. It is more preferred that the average particle size of the pigment-containing crosslinked polymer particles in the water-based ink is the same as the average particle size of the particles in the aforementioned pigment water dispersion. The preferred range of the average particle size of the pigment-containing crosslinked polymer particles in the water-based ink is also the same as the preferred range of the average particle size of the particles in the aforementioned pigment water dispersion. The average particle size of the pigment-containing crosslinked polymer particles in the water-based ink may be measured by the method described in Examples below.

From the viewpoint of improving continuous ejection stability of the resulting ink, the static surface tension of the water-based ink as measured at 20° C. is preferably not less than 23 mN/m and more preferably not less than 25 mN/m, and is also preferably not more than 45 mN/m and more preferably not more than 40 mN/m.

Meanwhile, the static surface tension of the water-based ink as measured at 20° C. may be measured by the method described in Examples below.

The viscosity of the water-based ink as measured at 35° C. is preferably not less than 1.0 mPa·s, more preferably not less than 1.5 mPa·s and even more preferably not less than 2.0 mPa·s, and is also preferably not more than 10 mPa·s, more preferably not more than 7.0 mPa·s and even more preferably not more than 4.0 mPa·s, from the viewpoint of improving continuous ejection stability of the resulting ink.

Meanwhile, the viscosity of the water-based ink as measured at 35° C. may be measured by the method described in Examples below.

As the method of ejecting an ink in the ink-jet printing method, there are known a piezoelectric method utilizing a mechanical energy and a thermal method utilizing a thermal energy. In the thermal ink-jet printing method, the ink may be ejected by the thermal method. In the thermal method, the ink undergoes a rapid change in volume thereof when applying a thermal energy thereto, and the rapid change in volume of the ink causes such an acting force as to eject the ink from nozzles. For example, the thermal method is preferably performed according to such a basic principle as described in specifications of U.S. Pat. Nos. 4,723,129 and 4,740,796. More specifically, as the thermal method, there may be mentioned those methods described in JP 61-59911B, etc.

The water-based ink in which the pigment water dispersion of the present invention is compounded is capable of achieving stable continuous ejection stability even when using the thermal method as the method for ejecting the ink, and therefore can be suitably used as a water-based ink for thermal ink-jet printing. The reason therefor is considered to be that the water-based ink in which the pigment water dispersion of the present invention is compounded has a reduced content of the unadsorbed polymer, and contains the pigment-containing crosslinked polymer particles that can be improved in thermal stability, and further the carbon black contained therein can be inhibited from coming into direct contact with a heater portion of a thermal printing head so that it becomes possible to suppress occurrence of kogation therein.

In addition, the water-based ink using the pigment water dispersion of the present invention is excellent in continuous ejection stability and therefore can be suitably used in high-speed printing, for example, in the ink-jet printing methods in which the printing is preferably conducted at a speed of not less than 50 sheets of A4 size paper per minute and more preferably not less than 60 sheets of A4 size paper per minute.

With respect to the aforementioned embodiments, the present invention further provides the following aspects relating to the pigment water dispersion and the process for producing the pigment water dispersion, as well as the water-based ink containing the pigment water dispersion and the ink-jet printing method using the water-based ink.

<1> A pigment water dispersion containing pigment-containing crosslinked polymer particles, in which a crosslinked polymer in the particles is a polymer that is crosslinked with a compound represented by the following general formula (1), and the pigment is a carbon black:

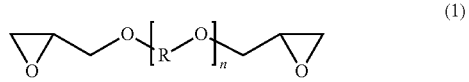

(1)

wherein R is an ethylene group or a propylene group, and n is an integer of not less than 1 and not more than 3.

<2> The pigment water dispersion according to the aspect <1>, wherein the crosslinked polymer is a crosslinked product of a water-dispersible polymer which is obtained by crosslinking the water-dispersible polymer with the compound represented by the aforementioned formula (1), and the water-dispersible polymer is a vinyl-based polymer that contains a constitutional unit derived from (a) a hydrophobic monomer and a constitutional unit derived from (b) an ionic monomer.

<3> The pigment water dispersion according to the aspect <2>, wherein the water-dispersible polymer further contains a constitutional unit derived from (c) a nonionic monomer.

<4> The pigment water dispersion according to the aspect <2> or <3>, wherein the water-dispersible polymer is a polymer containing a carboxy group.

<5> The pigment water dispersion according to any one of the aspects <2> to <4>, wherein the hydrophobic monomer (a) is preferably at least one monomer selected from the group consisting of an aromatic group-containing monomer, a (meth)acrylate containing a hydrocarbon group derived from an aliphatic alcohol and an aromatic group-containing monomer-based macromer, more preferably at least one monomer selected from the group consisting of an aromatic group-containing monomer and an aromatic group-containing monomer-based macromer, even more preferably at least one monomer selected from the group consisting of an aromatic group-containing (meth)acrylate and a styrene-based macromer, and further even more preferably a combination of an aromatic group-containing (meth)acrylate and a styrene-based macromer.

<6> The pigment water dispersion according to any one of the aspects <2> to <5>, wherein the ionic monomer (b) is preferably an anionic monomer, more preferably a carboxylic acid monomer, even more preferably (meth)acrylic acid, and further even more preferably methacrylic acid.

<7> The pigment water dispersion according to any one of the aspects <3> to <6>, wherein the nonionic monomer (c) is preferably an alkoxy polyalkylene glycol (meth)acrylate and more preferably octoxy polyethylene glycol (m=1 to 30) (meth)acrylate.

<8> The pigment water dispersion according to any one of the aspects <2> to <7>, wherein a content of the constitutional unit derived from the component (a) in the water-dispersible polymer is preferably not less than 40% by mass, more preferably not less than 45% by mass, even more preferably not less than 48% by mass and further even more preferably not less than 50% by mass, and is also preferably not more than 85% by mass, more preferably not more than 80% by mass, even more preferably not more than 75% by mass, further even more preferably not more than 70% by mass, still further even more preferably not more than 65% by mass and still further even more preferably not more than 60% by mass.

<9> The pigment water dispersion according to any one of the aspects <2> to <8>, wherein a content of the constitutional unit derived from the component (b) in the water-dispersible polymer is preferably not less than 10% by mass, more preferably not less than 13% by mass and even more preferably not less than 15% by mass, and is also preferably not more than 25% by mass, more preferably not more than 23% by mass and even more preferably not more than 21% by mass.

<10> The pigment water dispersion according to any one of the aspects <3> to <9>, wherein a content of the constitutional unit derived from the component (c) in the water-dispersible polymer is preferably not less than 0.1% by mass, more preferably not less than 10% by mass, even more preferably not less than 20% by mass and further even more preferably not less than 25% by mass, and is also preferably not more than 40% by mass, more preferably not more than 35% by mass and even more preferably not more than 31% by mass.

<11> The pigment water dispersion according to any one of the aspects <2> to <10>, wherein a mass ratio of the component (a) to the component (b) [component (a)/component (b)] is preferably not less than 0.5, more preferably not less than 1.0, even more preferably not less than 1.5, further even more preferably not less than 2.0 and still further even more preferably not less than 2.5, and is also preferably not more than 5.0, more preferably not more than 4.0 and even more preferably not more than 3.5.

<12> The pigment water dispersion according to any one of the aspects <2> to <11>, wherein a weight-average molecular weight of the water-dispersible polymer is preferably not less than 3,000, more preferably not less than 5,000, even more preferably not less than 10,000 and further even more preferably not less than 30,000, and is also preferably not more than 200,000, more preferably not more than 100,000, even more preferably not more than 80,000 and further even more preferably not more than 60,000.

<13> The pigment water dispersion according to any one of the aspects <2> to <12>, wherein an acid value of the water-dispersible polymer is preferably not less than 100 mgKOH/g and more preferably not less than 120 mgKOH/g, and is also preferably not more than 300 mgKOH/g, more preferably not more than 280 mgKOH/g, even more preferably not more than 250 mgKOH/g and further even more preferably not more than 200 mgKOH/g.

<14> The pigment water dispersion according to any one of the aspects <1> to <13>, wherein a DBP oil absorption of the carbon black is preferably not less than 50 mL/100 g, more preferably not less than 70 mL/100 g, even more preferably not less than 80 mL/100 g, further even more preferably not less than 90 mL/100 g and still further even more preferably not less than 100 mL/100 g, and is also preferably not more than 200 mL/100 g, more preferably not more than 180 mL/100 g, even more preferably not more than 150 mL/100 g and further even more preferably not more than 130 mL/100 g.

<15> The pigment water dispersion according to any one of the aspects <1> to <14>, wherein R in the aforementioned formula (1) is preferably an ethylene group.

<16> The pigment water dispersion according to any one of the aspects <1> to <15>, wherein n in the aforementioned formula (1) is preferably an integer of not less than 2, and is also preferably an integer of not more than 3, more preferably not more than 2, and even more preferably 2.

<17> The pigment water dispersion according to any one of the aspects <1> to <16>, wherein the compound represented by the aforementioned formula (1) is preferably at least one compound selected from the group consisting of ethylene glycol diglycidyl ether, propylene glycol diglycidyl ether, diethylene glycol diglycidyl ether, dipropylene glycol diglycidyl ether, triethylene glycol diglycidyl ether and tripropylene glycol diglycidyl ether; more preferably at least one compound selected from the group consisting of ethylene glycol diglycidyl ether, diethylene glycol diglycidyl ether and dipropylene glycol diglycidyl ether; even more preferably at least one compound selected from the group consisting of ethylene glycol diglycidyl ether and diethylene glycol diglycidyl ether; and further even more preferably diethylene glycol diglycidyl ether.

<18> The pigment water dispersion according to any one of the aspects <1> to <17>, wherein a content of a chloride ion as an impurity (chlorine content) in the compound (crosslinking agent) represented by the aforementioned formula (1) is preferably not more than 8.0% by mass, more preferably not more than 5.0% by mass, even more preferably not more than 3.0% by mass, further even more preferably not more than 1.0% by mass, still further even more preferably not more than 0.6% by mass, still further even more preferably not more than 0.5% by mass and still further even more preferably not more than 0.4% by mass, and is also not less than 0% by mass and preferably not less than 0.1% by mass.

<19> The pigment water dispersion according to any one of the aspects <1> to <18>, wherein a content of the pigment in the pigment water dispersion is preferably not less than 3.0% by mass, more preferably not less than 5.0% by mass, even more preferably not less than 7.0% by mass and further even more preferably not less than 9.0% by mass, and is also preferably not more than 20% by mass, more preferably not more than 17% by mass, even more preferably not more than 15% by mass and further even more preferably not more than 13% by mass.

<20> The pigment water dispersion according to any one of the aspects <1> to <19>, wherein a content of the crosslinked polymer in the pigment water dispersion is preferably not less than 0.5% by mass, more preferably not less than 1.0% by mass, even more preferably not less than 3.0% by mass and further even more preferably not less than 5.0% by mass, and is also preferably not more than 15% by mass, more preferably not more than 10% by mass and even more preferably not more than 7.0% by mass.

<21> The pigment water dispersion according to any one of the aspects <1> to <20>, wherein a mass ratio of the pigment to the crosslinked polymer [pigment/crosslinked polymer] in the pigment water dispersion is preferably from 85/15 to 50/50, more preferably from 80/20 to 55/45, even more preferably from 80/20 to 60/40, further even more preferably from 75/25 to 65/35 and still further even more preferably from 70/30 to 65/35.

<22> The pigment water dispersion according to any one of the aspects <1> to <21>, wherein an average particle size of the pigment-containing crosslinked polymer particles that are contained in the pigment water dispersion is preferably not less than 40 nm, more preferably not less than 50 nm and even more preferably not less than 60 nm, and is also preferably not more than 200 nm, more preferably not more than 150 nm and even more preferably not more than 130 nm.

<23> A process for producing a pigment water dispersion containing pigment-containing crosslinked polymer particles, including the following steps:

Step (1): subjecting a pigment mixture containing a water-dispersible polymer, a pigment and water to dispersion treatment, thereby obtaining an aqueous pigment dispersion solution containing pigment-containing polymer particles; and Step (2): mixing the aqueous pigment dispersion solution obtained in the step (1) and a compound represented by the following general formula (1) to react the water-dispersible polymer with the compound as a crosslinking agent to prepare a crosslinked polymer, thereby obtaining the pigment water dispersion containing pigment-containing crosslinked polymer particles:

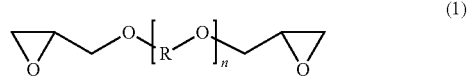

(1)

wherein R is an ethylene group or a propylene group, and n is an integer of not less than 1 and not more than 3.

<24> The process for producing a pigment water dispersion according to the aspect <23>, wherein an amount of the crosslinking agent as the compound represented by the aforementioned formula (1) which is used in the crosslinking reaction is preferably not less than 0.50 part by mass, more preferably not less than 1.0 part by mass, even more preferably not less than 2.0 parts by mass and further even more preferably not less than 3.0 parts by mass, and is also preferably not more than 15 parts by mass, more preferably not more than 13 parts by mass, even more preferably not more than 10 parts by mass and further even more preferably not more than 8.0 parts by mass, on the basis of 100 parts by mass of the water-dispersible polymer.

<25> The process for producing a pigment water dispersion according to the aspect <23> or <24>, wherein a crosslinking rate of the crosslinked polymer is preferably not less than 10 equivalent % and more preferably not less than 15 equivalent %, and is also preferably not more than 90 equivalent %, more preferably not more than 70 equivalent %, even more preferably not more than 50 equivalent % and further even more preferably not more than 30 equivalent %.

<26> A use of the pigment water dispersion according to any one of the aspects <1> to <22> for a water-based ink for ink-jet printing.

<27> A use of the pigment water dispersion according to any one of the aspects <1> to <22> in an ink-jet printing method in which an ink is ejected by a thermal method.

<28> A water-based ink for ink-jet printing, containing the pigment water dispersion according to any one of the aspects <1> to <22>, a solvent and water.

<29> The water-based ink for ink-jet printing according to the aspect <28>, wherein the water-based ink contains an organic solvent as the solvent, and a content of the organic solvent in the water-based ink is preferably not less than 4.0% by mass, more preferably not less than 5.0% by mass and even more preferably not less than 8.0% by mass, and is also preferably not more than 55% by mass, more preferably not more than 50% by mass, even more preferably not more than 40% by mass, further even more preferably not more than 30% by mass, still further even more preferably not more than 20% by mass, still further even more preferably not more than 15% by mass and still further even more preferably not more than 12% by mass.
<30> A use of the water-based ink according to the aspect <28> or <29> in an ink-jet printing method in which the water-based ink is ejected by a thermal method.
<31> An ink-jet printing method including the step of ejecting the water-based ink according to the aspect <28> or <29> onto a printing medium by a thermal method to print characters or images on the printing medium.

EXAMPLES

In the following Production Example, Examples and Comparative Examples, the "part(s)" and "%" indicate "part(s) by mass" and "% by mass", respectively, unless otherwise specified.

Meanwhile, various properties were measured by the following methods.

(1) Measurement of Weight-Average Molecular Weight of Water-Dispersible Polymer

The weight-average molecular weight of the water-dispersible polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min)] using a solution prepared by dissolving phosphoric acid and lithium bromide in N,N-dimethyl formamide such that the concentrations of phosphoric acid and lithium bromide in the solution were 60 mmol/L and 50 mmol/L, respectively, as an eluent, and using a monodisperse polystyrene having a known molecular weight (500, 4,000, 30,000, $9.64 \times 10^4$, $9.00 \times 10^5$ and $8.42 \times 10^6$) as a reference standard substance.

(2) Measurement of Solid Contents of Water-Dispersible Polymer Solution, Aqueous Pigment Dispersion Solution and Pigment Water Dispersion Sodium sulfate dried to constant weight in a desiccator was weighed in an amount of 10.0 g and charged into a 30 mL polypropylene container (φ: 40 mm; height: 30 mm), and 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a weight thereof. The weight of the sample after removing the volatile components therefrom was regarded as a weight of solids therein. The solid content of the sample was calculated by dividing the weight of the solids by the weight of the sample initially added.

(3) Static Surface Tensions of Pigment Water Dispersion and Water-Based Ink

Using a surface tension meter "CBVP-Z" (tradename) available from Kyowa Interface Science Co., Ltd., a platinum plate was dipped in 5 g of the pigment water dispersion or the water-based ink filled in a cylindrical polyethylene container (3.6 cm in diameter×1.2 cm in depth), and the static surface tension of the pigment water dispersion or the water-based ink thus filled was measured at 20° C. by the surface tension meter.

(4) Viscosities of Pigment Water Dispersion and Water-Based Ink

The viscosity of the pigment water dispersion or the water-based ink was measured at 35° C. using an E-type viscometer "Model No.: TV-25" (equipped with a standard cone rotor (1° 34'×R24); rotating speed: 50 rpm) available from Toki Sangyo Co., Ltd.

(5) Average Particle Size of Pigment-Containing Polymer Particles in Aqueous Pigment Dispersion Solution, and Average Particle Sizes of Pigment-Containing Crosslinked Polymer Particles in Pigment Water Dispersion and Ink The average particle sizes of the respective polymer particles were measured using a laser particle analyzing system "ELS-8000" (cumulant analysis) available from Otsuka Electrics Co., Ltd. The measurement was conducted at a temperature of 25° C., an angle between incident light and detector of 90° and a cumulative number of 100 times, and a refractive index of water (1.333) was input to the analyzing system as a refractive index of the dispersing medium. Further, the measurement was conducted by adjusting the concentration of the dispersion to be measured to $5 \times 10^{-3}$%.

Production of Water-Dispersible Polymer

Production Example 1

The monomers, the organic solvent and the chain transfer agent as shown in "Initially Charged Monomer Solution" in Table 1 were charged into a reaction vessel equipped with two dropping funnels 1 and 2 and mixed with each other, and an inside atmosphere of the reaction vessel was replaced with a nitrogen gas, thereby obtaining an initially charged monomer solution.

On the other hand, the monomers, the organic solvent, the polymerization initiator and the chain transfer agent as shown in "Dropping Monomer Solution 1" in Table 1 were mixed with each other to obtain a dropping monomer solution 1.

In addition, the monomers, the organic solvent, the polymerization initiator and the chain transfer agent as shown in "Dropping Monomer Solution 2" in Table 1 were mixed with each other to obtain a dropping monomer solution 2.

The resulting dropping monomer solutions 1 and 2 were charged into the dropping funnels 1 and 2, respectively. In a nitrogen atmosphere, the initially charged monomer solution in the reaction vessel was maintained at 75° C. while stirring, and the dropping monomer solution 1 in the dropping funnel 1 was gradually added dropwise into the reaction vessel over 3 hours. Then, the dropping monomer solution 2 in the dropping funnel 2 was gradually added dropwise into the reaction vessel over 2 hours. After completion of the dropwise addition of the dropping monomer solutions 1 and 2, the resulting mixed solution in the reaction vessel was stirred at 75° C. for 2 hours.

Next, a polymerization initiator solution prepared by dissolving 1.35 parts of the polymerization initiator as shown in Table 1 in 18 parts of methyl ethyl ketone (hereinafter also referred to merely as "MEK") was added to the aforementioned mixed solution, and the resulting reaction solution was aged at 75° C. for 1 hour while stirring. The aforementioned procedure including the preparation and addition of the polymerization initiator solution and the aging of the reaction solution was repeated two more times. Then, the reaction solution in the reaction vessel was maintained at 85° C. for 2 hours, thereby obtaining a water-dispersible polymer solution. The concentration of solid components in the thus obtained water-dispersible polymer solution was measured, and the water-dispersible polymer solution was diluted with MEK so as to adjust a solid content thereof to 38%.

In addition, a part of the resulting water-dispersible polymer was dried to measure a molecular weight of the polymer by the aforementioned method. As a result, it was confirmed that the weight-average molecular weight of the water-dispersible polymer was 50,000.

TABLE 1

|  |  | Reaction vessel Initially charged monomer solution | Dropping funnel 1 Dropping monomer solution 1 | Dropping funnel 2 Dropping monomer solution 2 |
| --- | --- | --- | --- | --- |
| Monomer composition (active ingredients) (part(s)) | (a) Benzyl acrylate | 36 | 288 | 36 |
|  | (a) Styrene macromer*[1] | 18 | 162 | 0 |
|  | (b) Methacrylic acid | 0 | 144 | 36 |
|  | (c) "NK ESTER EH-4E"*[2] | 27 | 216 | 27 |
| Organic solvent (part(s)) | MEK*[3] | 24.6 | 362.7 | 197.7 |
| Polymerization initiator (part(s)) | "V-65"*[4] | 0 | 7.2 | 1.8 |
| Chain transfer agent (part(s)) | 2-Mercaptoethanol | 0.3 | 1.89 | 0.54 |
| Weight-average molecular weight of water-dispersible polymer obtained |  |  | 50,000 |  |

The details of the respective asterisked signs shown in Table 1 are as follows.

*[1]: "AS-6S" (tradename; number-average molecular weight: 6,000; polystyrene methacrylate; end group: methacryloyl group; segment: styrene; toluene solution; solid content: 51%) available from Toagosei Co., Ltd.

*[2]: Octoxy polyethylene glycol monomethacrylate; "NK ESTER EH-4E" (tradename; average molar number of addition of ethyleneoxide: 4; end group: 2-ethylhexyl group) available from Shin-Nakamura Chemical Co., Ltd.

*[3]: Methyl ethyl ketone

*[4]: 2,2'-Azobis(2,4-dimethylvaleronitrile); "V-65" (tradename) available from Wako Pure Chemical Industries, Ltd.

Production of Pigment Water Dispersions

Example 1-1

(Step (1-1))

A 2 L-capacity disper "T.K. ROBOMIX" (equipped with "HOMODISPER 2.5 Model" as a stirring device; blade diameter: 40 mm) available from Primix Corporation was charged with 34 parts of the water-dispersible polymer solution (solid content: 38%) obtained in Production Example 1. While stirring the polymer solution in the disper at 1400 rpm, 11 parts of MEK as an organic solvent was added to the polymer solution, and then 100 parts of ion-exchanged water and 5.7 parts of a 5N (16.9%) sodium hydroxide aqueous solution were further added thereto. The resulting reaction solution was stirred at 1400 rpm for 15 minutes while cooling the solution in a water bath at 0° C. After the stirring, 30 parts of carbon black "NIpex 160IQ" (DBP oil absorption: 128 mL/100 g) available from Orion Engineered Carbons K.K., as the pigment was added to the resulting solution to obtain a pigment mixture, and the resulting pigment mixture was stirred at 8,000 rpm for 1 hour to subject the pigment mixture to preliminary dispersion treatment. The thus obtained dispersion was then subjected to dispersion treatment by passing the dispersion through a Microfluidizer "Model No.: M-140K" (tradename) available from Microfluidics Corporation under a pressure of 150 MPa 15 times, thereby obtaining a dispersion treatment product.

(Step (1-2))

Then, using a vacuum distillation apparatus (rotary evaporator) "N-1000S" (tradename) available from Tokyo Rikakikai Co., Ltd., the dispersion treatment product obtained in the step (1-1) was maintained in a warm bath adjusted to 40° C. under a pressure of 0.02 MPa for 2 hours to remove the organic solvent (MEK) therefrom. The obtained reaction solution was further maintained in the warm bath adjusted to 62° C. for 4 hours under such a condition that the pressure within the apparatus was reduced to 0.01 MPa to remove the organic solvent (MEK) and a part of water therefrom, thereby controlling a total concentration of the pigment and the water-dispersible polymer in the resulting solution to 20%. Next, the resulting reaction mixture was filtered through a 2.5 μm-mesh filter "20L-MPX-025XS" (tradename) available from ROKI Co., Ltd., thereby obtaining an aqueous pigment dispersion solution (solid content: 20%).

The average particle size of the pigment-containing polymer particles in the aqueous pigment dispersion solution was 118 nm.

(Step (2))

Next, 0.27 part of "DENACOL EX-850 L" (diethylene glycol diglycidyl ether; epoxy equivalent: 120) as a crosslinking agent available from Nagase ChemteX Corporation and 0.2 part of "Ploxel LVS" (1,2-benzisothiazol-3(2H)-one; active ingredient content: 20%; a mildew-proof agent) available from Arch Chemicals Japan Inc., were added to 80 parts of the aqueous pigment dispersion solution obtained in the step (1-2) (among which the content of the water-dispersible polymer was 4.8 parts), and then ion-exchanged water was further added to the resulting mixture to adjust a solid content thereof to 18%, followed by stirring the resulting dispersion at 70° C. for 1.5 hours to react the water-dispersible polymer with the crosslinking agent, thereby obtaining a pigment water dispersion containing pigment-containing crosslinked polymer particles having a crosslinking rate of 20 equivalent %. At this time, the amount of the crosslinking agent used was 5.6 parts on the basis of 100 parts of the water-dispersible polymer.

The average particle size of the pigment-containing crosslinked polymer particles in the pigment water dispersion was 118 nm.

Example 1-2

The same procedure as in Example 1-1 was repeated except that "DENACOL EX-850L" was replaced with 0.27 part of "DENACOL EX-850" (diethylene glycol diglycidyl ether; epoxy equivalent: 122) available from Nagase ChemteX Corporation, thereby obtaining a pigment water dispersion containing pigment-containing crosslinked polymer particles. At this time, the amount of the crosslinking agent used was 5.6 parts on the basis of 100 parts of the water-dispersible polymer.

Example 1-3

The same procedure as in Example 1-1 was repeated except that "DENACOL EX-850L" was replaced with 0.39 part of "DENACOL EX-941" (polypropylene glycol diglycidyl ether; n=2 (catalogue value); epoxy equivalent: 173) available from Nagase ChemteX Corporation, thereby obtaining a pigment water dispersion containing pigment-containing crosslinked polymer particles. At this time, the amount of the crosslinking agent used was 8.1 parts on the basis of 100 parts of the water-dispersible polymer.

Example 1-4

The same procedure as in Example 1-1 was repeated except that "DENACOL EX-850L" was replaced with 0.25 part of "DENACOL EX-810" (ethylene glycol diglycidyl ether; epoxy equivalent: 113) available from Nagase ChemteX Corporation, thereby obtaining a pigment water dispersion containing pigment-containing crosslinked polymer particles. At this time, the amount of the crosslinking agent used was 5.2 parts on the basis of 100 parts of the water-dispersible polymer.

Example 1-5

The same procedure as in Example 1-1 was repeated except that "DENACOL EX-850L" was replaced with 0.39 part of "DENACOL EX-920" (polypropylene glycol diglycidyl ether; n=3 (catalogue value); epoxy equivalent: 176) available from Nagase ChemteX Corporation, thereby obtaining a pigment water dispersion containing pigment-containing crosslinked polymer particles. At this time, the amount of the crosslinking agent used was 8.1 parts on the basis of 100 parts of the water-dispersible polymer.

Example 1-6

The same procedure as in Example 1-1 was repeated except that the carbon black used therein was replaced with "MONARCH 717" (DBP oil absorption: 53 mL/100 g) available from Cabot Corporation, thereby obtaining a pigment water dispersion containing pigment-containing crosslinked polymer particles.

Example 1-7

The same procedure as in Example 1-2 was repeated except that the carbon black used therein was replaced with "MONARCH 717" (DBP oil absorption: 53 mL/100 g) available from Cabot Corporation, thereby obtaining a pigment water dispersion containing pigment-containing crosslinked polymer particles.

Example 1-8

The same procedure as in Example 1-3 was repeated except that the carbon black used therein was replaced with "MONARCH 717" (DBP oil absorption: 53 mL/100 g) available from Cabot Corporation, thereby obtaining a pigment water dispersion containing pigment-containing crosslinked polymer particles.

Example 1-9

The same procedure as in Example 1-4 was repeated except that the carbon black used therein was replaced with "MONARCH 717" (DBP oil absorption: 53 mL/100 g) available from Cabot Corporation, thereby obtaining a pigment water dispersion containing pigment-containing crosslinked polymer particles.

Example 1-10

The same procedure as in Example 1-5 was repeated except that the carbon black used therein was replaced with "MONARCH 717" (DBP oil absorption: 53 mL/100 g) available from Cabot Corporation, thereby obtaining a pigment water dispersion containing pigment-containing crosslinked polymer particles.

Comparative Example 1-1

The same procedure as in Example 1-1 was repeated except that "DENACOL EX-850L" was replaced with 0.41 part of "DENACOL EX-821" (polyethylene glycol diglycidyl ether; n=4 (catalogue value); epoxy equivalent: 185) available from Nagase ChemteX Corporation, thereby obtaining a pigment water dispersion containing pigment-containing crosslinked polymer particles. At this time, the amount of the crosslinking agent used was 8.5 parts on the basis of 100 parts of the water-dispersible polymer.

Comparative Example 1-2

The same procedure as in Example 1-6 was repeated except that "DENACOL EX-850L" was replaced with 0.41 part of "DENACOL EX-821" (polyethylene glycol diglycidyl ether; n=4 (catalogue value); epoxy equivalent: 185) available from Nagase ChemteX Corporation, thereby obtaining a pigment water dispersion containing pigment-containing crosslinked polymer particles. At this time, the amount of the crosslinking agent used was 8.5 parts on the basis of 100 parts of the water-dispersible polymer.

Comparative Example 1-3

The same procedure as in Example 1-1 was repeated except that "DENACOL EX-850L" was replaced with 0.60 part of "DENACOL EX-830" (polyethylene glycol diglycidyl ether; n=9 (catalogue value); epoxy equivalent: 268) available from Nagase ChemteX Corporation, thereby obtaining a pigment water dispersion containing pigment-containing crosslinked polymer particles. At this time, the amount of the crosslinking agent used was 12.5 parts on the basis of 100 parts of the water-dispersible polymer.

Comparative Example 1-4

The same procedure as in Example 1-1 was repeated except that the carbon black used therein was replaced with C.I. Pigment Yellow 74 "Fast Yellow 840" available from Dainichiseika Color & Chemicals Mfg. Co., Ltd., thereby obtaining a pigment water dispersion containing pigment-containing crosslinked polymer particles.

Comparative Example 1-5

The same procedure as in Example 1-1 was repeated except that the carbon black used therein was replaced with C.I. Pigment Red 122 "CFR6111T" available from Dainichiseika Color & Chemicals Mfg. Co., Ltd., thereby obtaining a pigment water dispersion containing pigment-containing crosslinked polymer particles.

Comparative Example 1-6

The same procedure as in Example 1-1 was repeated except that the carbon black used therein was replaced with C.I. Pigment Blue 15:3 "CFB6338JC" available from Dainichiseika Color & Chemicals Mfg. Co., Ltd., thereby obtaining a pigment water dispersion containing pigment-containing crosslinked polymer particles.

The pigment water dispersions obtained in Examples 1-1 to 1-10 and Comparative Examples 1-1 to 1-6 all had a static surface tension of 43 mN/m.

The pigment water dispersions obtained in Examples 1-1 to 1-10 and Comparative Examples 1-1 to 1-3 had a viscosity of 2.3 mPa·s; the pigment water dispersion obtained in Comparative Example 1-4 had a viscosity of 2.8 mPa·s; the pigment water dispersion obtained in Comparative Example 1-5 had a viscosity of 2.6 mPa·s; and the pigment water dispersion obtained in Comparative Example 1-6 had a viscosity of 2.2 mPa·s.

Production of Water-Based Inks

Examples 2-1 to 2-10 and Comparative Examples 2-1 to 2-3

(Water-Based Inks Containing Carbon Black)

The pigment water dispersions obtained in Examples 1-1 to 1-10 and Comparative Examples 1-1 to 1-3 were respectively compounded with "Polyethylene Glycol 400" as a solvent and "SURFYNOL 104 PG-50" and "EMULGEN 120" both as a surfactant, and further compounded with water as the balance. The resulting mixed solutions were respectively filtered through a 0.3 μm-mesh filter "20L-MBP-003XS" (tradename) available from ROKI Co., Ltd., thereby obtaining water-based inks.

Meanwhile, the contents of the respective components in the thus obtained water-based inks were as follows. That is, the total content of the pigment and the crosslinked polymer in the respective water-based inks was 7.1%; the content of "Polyethylene Glycol 400" (hereinafter also referred to merely as "PEG400") therein was 10%; the content of "SURFYNOL 104 PG-50" (a propylene glycol solution of an acetylene glycol-based surfactant; active ingredient content: 50%) available from Air Products & Chemicals, Inc., therein was 0.5%; and the content of "EMULGEN 120" (polyoxyethylene lauryl ether) available from Kao Corporation therein was 0.5%. Also, the content of the solvent in the respective water-based inks was 10.25% when calculated assuming that the amount of propylene glycol derived from "SURFYNOL 104 PG-50" was also included in the amount of the solvent.

The water-based inks obtained in Examples 2-1 to 2-10 and Comparative Examples 2-1 to 2-3 had a static surface tension of 31 mN/m and a viscosity of 2.3 mPa·s, and the average particle size of the pigment-containing crosslinked polymer particles in the respective water-based inks was 119 nm.

Comparative Example 2-4

(Water-Based Ink Containing C.I. Pigment Yellow 74)

The pigment water dispersion obtained in Comparative Example 1-4 was compounded with a solvent and a surfactant and further with water as the balance, and the resulting mixed solution was filtered through a 0.3 μm-mesh filter "20L-MBP-003XS" (tradename) available from ROKI Co., Ltd., thereby obtaining a water-based ink.

The contents of the respective components in the thus obtained water-based ink were as follows. That is, the total content of the pigment and the crosslinked polymer in the water-based ink was 5.7%; the content of "PEG400" therein was 10%; the content of "SURFYNOL 104 PG-50" (a propylene glycol solution of an acetylene glycol-based surfactant; active ingredient content: 50%) available from Air Products & Chemicals, Inc., therein was 0.5%; and the content of "EMULGEN 120" (polyoxyethylene lauryl ether) available from Kao Corporation therein was 0.5%.

The water-based ink obtained in Comparative Example 2-4 had a static surface tension of 28 mN/m and a viscosity of 2.3 mPa·s, and the average particle size of the pigment-containing crosslinked polymer particles in the water-based ink was 129 nm.

Comparative Example 2-5

(Water-Based Ink Containing C.I. Pigment Red 122)

The pigment water dispersion obtained in Comparative Example 1-5 was compounded with a solvent and a surfactant and further with water as the balance, and the resulting mixed solution was filtered through a 0.3 μm-mesh filter "20L-MBP-003XS" (tradename) available from ROKI Co., Ltd., thereby obtaining a water-based ink.

The contents of the respective components in the thus obtained water-based ink were as follows. That is, the total content of the pigment and the crosslinked polymer in the water-based ink was 7.1%; the content of "PEG400" therein was 10%; the content of "SURFYNOL 104 PG-50" available from Air Products & Chemicals, Inc., therein was 0.5%; and the content of "EMULGEN 120" available from Kao Corporation therein was 0.5%.

The water-based ink obtained in Comparative Example 2-5 had a static surface tension of 28 mN/m and a viscosity of 2.3 mPa·s, and the average particle size of the pigment-containing crosslinked polymer particles in the water-based ink was 116 nm.

Comparative Example 2-6

(Water-Based Ink Containing C.I. Pigment Blue 15:3)

The pigment water dispersion obtained in Comparative Example 1-6 was compounded with a solvent and a surfactant and further with water as the balance, and the resulting mixed solution was filtered through a 0.3 µm-mesh filter "20L-MBP-003XS" (tradename) available from ROKI Co., Ltd., thereby obtaining a water-based ink.

The contents of the respective components in the thus obtained water-based ink were as follows. That is, the total content of the pigment and the crosslinked polymer in the water-based ink was 5.0%; the content of "PEG400" therein was 18%; the content of "SURFYNOL 104 PG-50" available from Air Products & Chemicals, Inc., therein was 0.5%; and the content of "EMULGEN 120" available from Kao Corporation therein was 0.5%.

The water-based ink obtained in Comparative Example 2-6 had a static surface tension of 28 mN/m and a viscosity of 2.3 mPa·s, and the average particle size of the pigment-containing crosslinked polymer particles in the water-based ink was 86 nm.

The water-based inks obtained in the respective Examples and Comparative Examples were evaluated for the following items.

<Evaluation of Continuous Ejection Stability>

Using an ink-jet printer "LPP-6010N" equipped with a thermal printing head available from LG Electronics Inc., which was modified by drawing a feed tube out of the printer and introducing the tube into an ink tank to allow the printer to be ready for printing, 100%-Duty printing was conducted in Best Mode at a resolution of 1600 dpi in vertical direction×1600 dpi in lateral direction under environmental conditions of a temperature of 25±1° C. and a relative humidity of 30±5%.

The continuous ejection stability of the water-based ink was determined by conducting the aforementioned continuous printing on sheets of A4 size plain paper to count and measure the number of sheets of A4 size plain paper printed until an optical density value of the ink printed on a predetermined sheet of A4 size plain paper was lower than that printed on the 1st sheet of A4 size plain paper, and evaluated according to the following evaluation ratings. As the plain paper, there was used "All-in One paper" available from Office Maxs. If the evaluation rating was A, B or C, it was possible to use the water-based ink in practical applications. The results are shown in Table 2.

Meanwhile, the optical density was determined as follows. That is, the optical density (as a value outputted as optical density of black images) of the printed material prepared above on the plain paper was measured at five points in total using a Macbeth densitometer "SpectroEye" (part number) available from GretagMacbeth GmbH under the following measuring conditions: observation viewing angle: 2°; observation light source: $D_{65}$; reference white level: Abs; polarizing filter: none; density standard: DIN, and an average value of the thus measured five values was calculated and used as the optical density of the printed material.

(Evaluation Ratings)

A: Not less than 15,000 sheets of A4 size paper;
B: Not less than 10,000 sheets and less than 15,000 sheets of A4 size paper;
C: Not less than 5,000 sheets and less than 10,000 sheets of A4 size paper;
D: Not less than 1,000 sheets and less than 5,000 sheets of A4 size paper; and
E: Less than 1,000 sheets of A4 size paper.

<Evaluation of Kogation>

The same continuous printing as described in the aforementioned "Evaluation of Continuous Ejection Stability" was conducted on 10,000 sheets of the plain paper. Thereafter, a heater portion within a chamber of the thermal printing head was washed with pure water, and then the surface of the heater portion was observed using an optical microscope to evaluate occurrence of kogation according to the following evaluation ratings. The evaluation rating of A, B or C indicates that the obtained water-based ink was usable in practical applications. The results are shown in Table 2.

(Evaluation Ratings)

A: Deposits were present only on not less than 0% and less than 5% of the surface of the heater portion.

B: Deposits were present on not less than 5% and less than 30% of the surface of the heater portion.

C: Deposits were present on not less than 30% and less than 60% of the surface of the heater portion.

D: Deposits were present on not less than 60% and not more than 100% of the surface of the heater portion.

Meanwhile, the details of the pigments and the crosslinking agents shown in Table 2 are as follows.

(Pigment)

160IQ: Carbon Black "Nlpex 160IQ" (DBP oil absorption: 128 mL/100 g; volatile content: 5.0%) available from Orion Engineered Carbons K.K.

M717: Carbon Black "MONARCH 717" (DBP oil absorption: 53 mL/100 g; volatile content: 1.0%) available from Cabot Corporation PY74: C.I. Pigment Yellow 74 "Fast Yellow 840" available from Dainichiseika Color & Chemicals Mfg. Co., Ltd.

PR122: C.I. Pigment Red 122 "CFR6111T" available from Dainichiseika Color & Chemicals Mfg. Co., Ltd.

PB15:3: C.I. Pigment Blue 15:3 "CFB6338JC" available from Dainichiseika Color & Chemicals Mfg. Co., Ltd.

(Crosslinking Agent)

EX-850L: "DENACOL EX-850L" (diethylene glycol diglycidyl ether; n=2; epoxy equivalent: 120; chlorine content: 0.4% by mass) available from Nagase ChemteX Corporation EX-850: "DENACOL EX-850" (diethylene glycol diglycidyl ether; n=2; epoxy equivalent: 122; chlorine content: 0.5% by mass) available from Nagase ChemteX Corporation EX-941: "DENACOL EX-941" (polypropylene glycol diglycidyl ether; n=2 (catalogue value); epoxy equivalent: 173; chlorine content: 7.1% by mass) available from Nagase ChemteX Corporation EX-810: "DENACOL EX-810" (ethylene glycol diglycidyl ether; n=1; epoxy equivalent: 113; chlorine content: 0.6% by mass) available from Nagase ChemteX Corporation EX-920: "DENACOL EX-920" (polypropylene glycol diglycidyl ether; n=3 (catalogue value); epoxy equivalent: 176; chlorine content: 0.8% by mass) available from Nagase ChemteX Corporation EX-821: "DENACOL EX-821" (polyethylene glycol diglycidyl ether; n=4 (catalogue value); epoxy equivalent: 185; chlorine content: 4.5% by mass) available from Nagase ChemteX Corporation EX-830: "DENACOL EX-830" (polyethylene glycol diglycidyl ether; n=9 (catalogue value); epoxy equivalent: 268; chlorine content: 0.3% by mass) available from Nagase ChemteX Corporation

TABLE 2

| | | | Crosslinking agent | | | Pigment | | | Evaluation | |
|---|---|---|---|---|---|---|---|---|---|---|
| | | | | | | Black (carbon black) | | | | |
| | Pigment water dispersion | Ink | Kind | R in formula (1) | n in formula (1) | Kind | DBP oil absorption (mL/100 g) | Chromatic color Kind | Continuous ejection stability | Kogation |
| Examples | 1-1 | 2-1 | EX-850L | 1* | 2 | 160IQ | 128 | — | A | A |
| | 1-2 | 2-2 | EX-850 | 1* | 2 | 160IQ | 128 | — | A | B |
| | 1-3 | 2-3 | EX-941 | 2* | 2 | 160IQ | 128 | — | B | B |
| | 1-4 | 2-4 | EX-810 | 1* | 1 | 160IQ | 128 | — | B | B |
| | 1-5 | 2-5 | EX-920 | 2* | 3 | 160IQ | 128 | — | B | C |
| | 1-6 | 2-6 | EX-850L | 1* | 2 | M717 | 53 | — | C | B |
| | 1-7 | 2-7 | EX-850 | 1* | 2 | M717 | 53 | — | C | B |
| | 1-8 | 2-8 | EX-941 | 2* | 2 | M717 | 53 | — | C | C |
| | 1-9 | 2-9 | EX-810 | 1* | 1 | M717 | 53 | — | C | C |
| | 1-10 | 2-10 | EX-920 | 2* | 3 | M717 | 53 | — | C | C |
| Comparative Examples | 1-1 | 2-1 | EX-821 | 1* | 4 | 160IQ | 128 | — | D | D |
| | 1-2 | 2-2 | EX-821 | 1* | 4 | M717 | 53 | — | E | D |
| | 1-3 | 2-3 | EX-830 | 1* | 9 | 160IQ | 128 | — | E | D |
| | 1-4 | 2-4 | EX-850L | 1* | 2 | — | — | PY74 | E | D |
| | 1-5 | 2-5 | EX-850L | 1* | 2 | — | — | PR122 | E | D |
| | 1-6 | 2-6 | EX-850L | 1* | 2 | — | — | PB15:3 | E | D |

Note
1* Ethylene group
2* Propylene group

From Table 2, it was confirmed that the water-based inks containing the respective pigment water dispersions obtained in Examples 1-1 to 1-10 were excellent in continuous ejection stability, and fully inhibited from suffering from occurrence of kogation as compared to the water-based inks containing the respective pigment water dispersions obtained in Comparative Examples 1-1 to 1-3 because the crosslinking agents represented by the aforementioned formula (1) in which n is not more than 3 were used in the former water-based inks.

It was also confirmed that the water-based inks containing the respective pigment water dispersions obtained in Examples 1-1 to 1-10 were excellent in continuous ejection stability, and fully inhibited from suffering from occurrence of kogation as compared to the water-based inks containing the respective pigment water dispersions obtained in Comparative Examples 1-4 to 1-6 in which the chromatic pigments other than carbon blacks were used.

From these results, it is recognized that the remarkable effects of the present invention including excellent thermal stability and continuous ejection stability can be specially exhibited owing to the combination of the carbon black as the pigment and the aforementioned specific crosslinking agent.

INDUSTRIAL APPLICABILITY

The pigment water dispersion of the present invention is excellent in continuous ejection stability of an ink when compounded in the ink, and therefore can be suitably used as a pigment water dispersion for flexographic printing, gravure printing or ink-jet printing. In addition, the pigment water dispersion of the present invention is prevented from suffering from occurrence of kogation, and therefore can be suitably used as a pigment water dispersion for thermal ink-jet printing.

The invention claimed is:

1. A pigment water dispersion comprising pigment-containing crosslinked polymer particles,
   in which a crosslinked polymer in the particles is a polymer that is crosslinked with
   diethylene glycol diglycidyl ether, wherein a content of a chloride ion as an impurity in the crosslinking agent is not more than 8.0% by mass and not less than 0% by mass,
   the crosslinked polymer is a crosslinked product of a water-dispersible polymer which is obtained by crosslinking the water-dispersible polymer with the crosslinking agent, and the water-dispersible polymer is a vinyl polymer comprising a constitutional unit derived from (a) a hydrophobic monomer, a constitutional unit derived from (b) an ionic monomer, and a constitutional unit derived from (c) a nonionic monomer, and
   the nonionic monomer (c) is at least one monomer selected from the group consisting of polyalkylene glycol (meth)acrylates, alkoxy polyalkylene glycol (meth)acrylates, and aralkoxy polyalkylene glycol (meth)acrylate,
   in which the pigment is a carbon black, wherein a DBP oil absorption of the carbon black is not less than 50 mL/100 g and not more than 200 mL/100 g.

2. The pigment water dispersion according to claim 1, wherein the water-dispersible polymer is a carboxy group-containing polymer.

3. The pigment water dispersion according to claim 1, wherein a content of the crosslinked polymer in the pigment water dispersion is not less than 0.5% by mass and not more than 15% by mass.

4. The pigment water dispersion according to claim 1, wherein a mass ratio of the pigment to the crosslinked polymer [pigment/crosslinked polymer] in the pigment water dispersion is from 85/15 to 50/50.

5. The pigment water dispersion according to claim 1, wherein an average particle size of the pigment-containing crosslinked polymer particles in the pigment water dispersion is not less than 40 nm and not more than 200 nm.

6. The pigment water dispersion according to claim 1, wherein a DBP oil absorption of the carbon black is not less than 70 mL/100 g and not more than 200 mL/100 g.

7. The pigment water dispersion according to claim 1, wherein a content of the constitutional unit derived from the nonionic monomer (c) in the water-dispersible polymer is not less than 0.1% by mass and not more than 40% by mass.

8. The pigment water dispersion according to claim 1, wherein a mass ratio of the hydrophobic monomer (a) to the ionic monomer (b) [the hydrophobic monomer (a)/ the ionic monomer (b)] is not less than 0.5 and not more than 5.0.

9. The pigment water dispersion according to claim 1, wherein the nonionic monomer (c) is alkoxy polyalkylene glycol (meth)acrylates.

10. The pigment water dispersion according to claim 1, wherein the pigment water dispersion is a pigment water dispersion for thermal ink-jet printing.

11. An ink-jet printing method comprising the step of ejecting a water-based ink comprising the pigment water dispersion according to claim 1, a solvent and water onto a printing medium by a thermal method to print characters or images on the printing medium.

* * * * *